US007231202B2

(12) United States Patent
Natsuno

(10) Patent No.: US 7,231,202 B2
(45) Date of Patent: Jun. 12, 2007

(54) METHOD FOR INHIBITING USE OF MOBILE COMMUNICATION TERMINAL HAVING MEMORY WHERE CARD INFORMATION IS STORED, MOBILE COMMUNICATION NETWORK, AND MOBILE COMMUNICATION TERMINAL

(75) Inventor: Takeshi Natsuno, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 353 days.

(21) Appl. No.: 09/890,830

(22) PCT Filed: Dec. 7, 2000

(86) PCT No.: PCT/JP00/08655

§ 371 (c)(1),
(2), (4) Date: Aug. 6, 2001

(87) PCT Pub. No.: WO01/43412

PCT Pub. Date: Jun. 14, 2001

(65) Prior Publication Data

US 2003/0045328 A1    Mar. 6, 2003

(30) Foreign Application Priority Data

Dec. 10, 1999   (JP)   ................... 11-352265
Dec. 10, 1999   (JP)   ................... 11-352266

(51) Int. Cl.
*H04M 1/66*   (2006.01)
(52) U.S. Cl. ............... 455/410; 455/411; 455/558; 235/380
(58) Field of Classification Search ............ 455/410, 455/411, 33; 379/144; 713/151, 201; 709/217, 709/219; 235/380; 705/43, 37
See application file for complete search history.

(56) References Cited

U.S. PATENT DOCUMENTS 4,860,341 A * 8/1989 D'Avello et al. ........... 455/409

(Continued)

FOREIGN PATENT DOCUMENTS

EP    0 757 502 A2    2/1997

(Continued)

OTHER PUBLICATIONS

Nikkei Digital Money Systems, No. 54, Nikkei Business Publications, Inc., Nov. 15, 1999 p. 5.

(Continued)

*Primary Examiner*—Jean Gelin
*Assistant Examiner*—Phuoc Doan
(74) *Attorney, Agent, or Firm*—Brinks Hofer Gilson & Lione

(57) ABSTRACT

In a mobile communication network equipped with a wireless communication interface with a mobile communication terminal, when a need arises for disabling calling and card functions of a mobile communication terminal with a plurality of card information stored, there is provided a credit transaction system for permitting the process of disabling the calling and card functions of the mobile communication terminal, comprising a mobile station 100, a mobile telephone network 20, a mobile packet communication network 30, a CAT terminal 40*a*, 40*b*, . . . , the CAFIS network 50, a credit company's server 60A, 60B, and the Internet 70. Credit disablement flags are set in a control station 33, and the mobile station 100 receives a disabling signal from the control station 33 through a base station 31. The mobile station 100 subsequently deletes credit contract information stored in itself.

9 Claims, 32 Drawing Sheets

U.S. PATENT DOCUMENTS

| | | | |
|---|---|---|---|
| 5,274,368 A | 12/1993 | Breeden et al. | |
| 5,659,595 A | 8/1997 | Chanu et al. | |
| 5,864,757 A | 1/1999 | Parker | |
| 5,898,783 A | 4/1999 | Rohrbach | |
| 6,466,783 B2* | 10/2002 | Dahm et al. | 455/414.2 |
| 6,470,447 B1* | 10/2002 | Lambert et al. | 713/151 |
| 6,742,022 B1* | 5/2004 | King et al. | 709/219 |
| 6,754,833 B1* | 6/2004 | Black et al. | 713/201 |
| 6,760,758 B1* | 7/2004 | Lund et al. | 709/217 |
| 7,024,385 B1* | 4/2006 | Adcock et al. | 705/37 |
| 2001/0056402 A1* | 12/2001 | Ahuja et al. | 705/43 |
| 2004/0173675 A1* | 9/2004 | Haraguchi | 235/380 |
| 2005/0002419 A1* | 1/2005 | Doviak et al. | 370/466 |

FOREIGN PATENT DOCUMENTS

| | | |
|---|---|---|
| EP | 0 843 290 A2 | 5/1998 |
| JP | H6-164493 | 6/1994 |
| JP | H9-18610 | 1/1997 |
| JP | 09-182158 | 7/1997 |
| JP | H9-215057 | 8/1997 |
| JP | 10-143570 | 5/1998 |
| JP | H10-177525 | 6/1998 |
| JP | 10-232897 | 9/1998 |
| JP | H11-170752 | 6/1999 |
| JP | H11-184756 | 7/1999 |

OTHER PUBLICATIONS

Canadian Office Action, CA Pat. App. No. 2,356,357, Nov. 10, 2006.

* cited by examiner

FIG. 5

| TELEPHONE NUMBER | USER'S NAME | SEX | DATE OF BIRTH | DISABLEMENT INFORMATION | | | 331 |
|---|---|---|---|---|---|---|---|
| ...... | ...... | ...... | ...... | ...... | ...... | ...... | ...... |
| ...... | ...... | ...... | ...... | ...... | ...... | ...... | ...... |
| ...... | ...... | ...... | ...... | ...... | ...... | ...... | ...... |
| ...... | ...... | ...... | ...... | ...... | ...... | ...... | ...... |
| ...... | ...... | ...... | ...... | ...... | ...... | ...... | ...... |
| ...... | ...... | ...... | ...... | ...... | ...... | ...... | ...... |
| ...... | ...... | ...... | ...... | ...... | ...... | ...... | ...... |

FIG. 6

| PHONE NUMBER | USER'S NAME | SEX | DATE OF BIRTH | STORAGE LOCATION | PASSWORD | | 304 |
|---|---|---|---|---|---|---|---|
| ...... | ...... | ...... | ...... | ...... | ...... | ...... | ...... |
| ...... | ...... | ...... | ...... | ...... | ...... | ...... | ...... |
| ...... | ...... | ...... | ...... | ...... | ...... | ...... | ...... |
| ...... | ...... | ...... | ...... | ...... | ...... | ...... | ...... |
| ...... | ...... | ...... | ...... | ...... | ...... | ...... | ...... |
| ...... | ...... | ...... | ...... | ...... | ...... | ...... | ...... |
| ...... | ...... | ...... | ...... | ...... | ...... | ...... | ...... |
| | | | | | | | ...... |

FIG. 7

| NAME | AGE | ADDRESS | PHONE NUMBER | EMPLOYMENT | ANNUAL INCOME | CARD NUMBER | EXPIRATION DATE | CREDIT LIMIT | ...... |
|---|---|---|---|---|---|---|---|---|---|
| ...... | ...... | ...... | ...... | ...... | ...... | ...... | ...... | ...... | ...... |
| ...... | ...... | ...... | ...... | ...... | ...... | ...... | ...... | ...... | ...... |
| ...... | ...... | ...... | ...... | ...... | ...... | ...... | ...... | ...... | ...... |
| ...... | ...... | ...... | ...... | ...... | ...... | ...... | ...... | ...... | ...... |
| ...... | ...... | ...... | ...... | ...... | ...... | ...... | ...... | ...... | ...... |
| ...... | ...... | ...... | ...... | ...... | ...... | ...... | ...... | ...... | ...... |
| ...... | ...... | ...... | ...... | ...... | ...... | ...... | ...... | ...... | ...... |

FIG. 8

| USER NAME A | | | | |
|---|---|---|---|---|
| DATE OF TRANSACTION | MERCHANT | AMOUNT OF TRANSACTION | MONTH SETTLED | AMOUNT SETTLED |
| ...... | ...... | ...... | ...... | ...... |
| ...... | ...... | ...... | ...... | ...... |
| ...... | ...... | ...... | ...... | ...... |
| ...... | ...... | ...... | ...... | ...... |
| ...... | ...... | ...... | ...... | ...... |
| ...... | ...... | ...... | ...... | ...... |
| ...... | ...... | ...... | ...... | ...... |
| ...... | ...... | ...... | ...... | ...... |
| USER NAME B | | | | |
| DATE OF TRANSACTION | MERCHANT | AMOUNT OF TRANSACTION | MONTH SETTLED | AMOUNT SETTLED |
| ...... | ...... | ...... | ...... | ...... |
| ...... | ...... | ...... | ...... | ...... |
| ...... | ...... | ...... | ...... | ...... |
| ...... | ...... | ...... | ...... | ...... |
| ...... | ...... | ...... | ...... | ...... |
| ...... | ...... | ...... | ...... | ...... |
| ...... | ...... | ...... | ...... | ...... |
| ...... | ...... | ...... | ...... | ...... |

FIG. 9

| NAME | PHONE NUMBER | CARD NUMBER | EXPIRATION DATE | ...... |
|------|--------------|-------------|-----------------|--------|
| ...... | ...... | ...... | ...... | ...... |
| ...... | ...... | ...... | ...... | ...... |
| ...... | ...... | ...... | ...... | ...... |
| ...... | ...... | ...... | ...... | ...... |
| ...... | ...... | ...... | ...... | ...... |
| ...... | ...... | ...... | ...... | ...... |
| ...... | ...... | ...... | ...... | ...... |

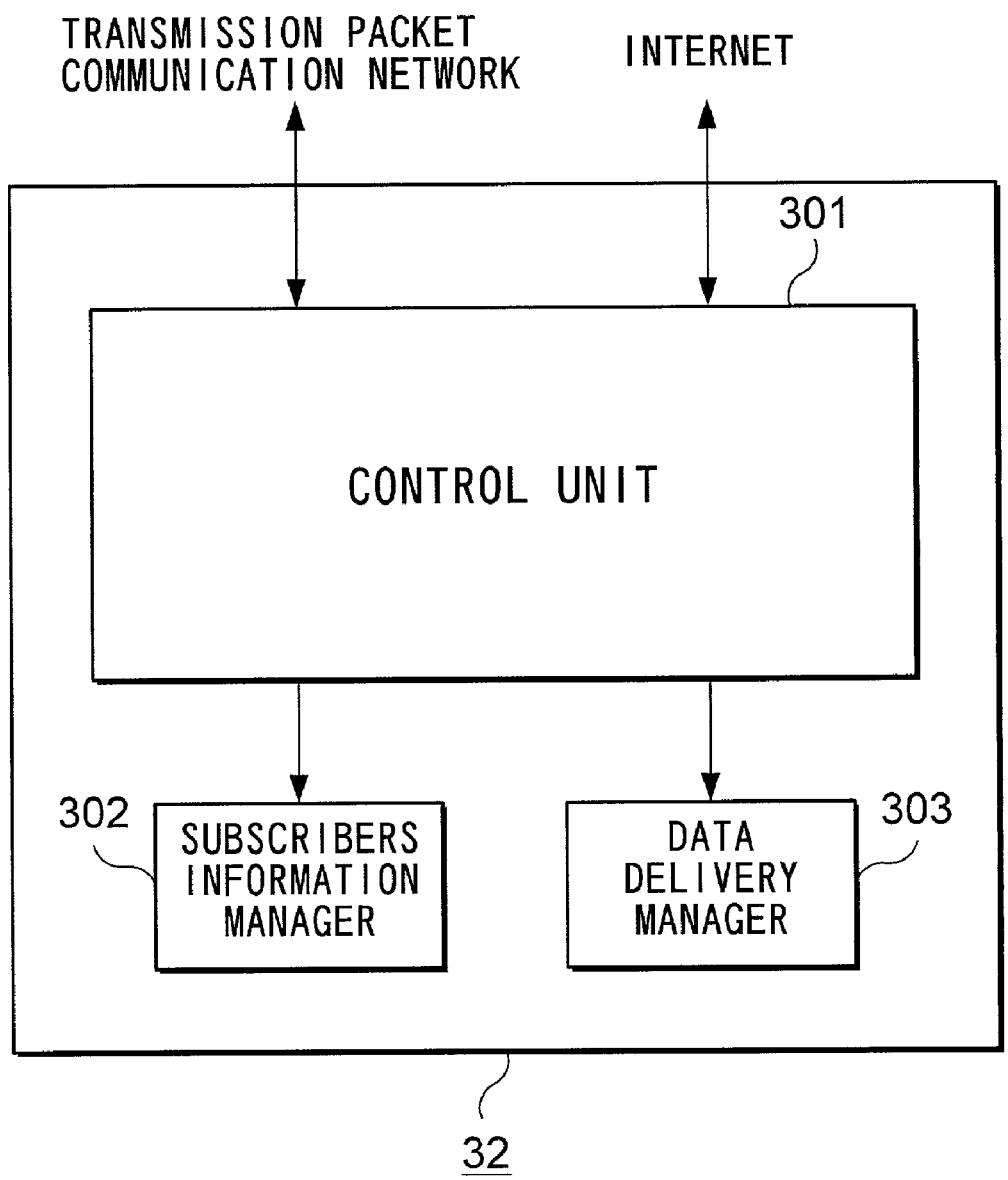

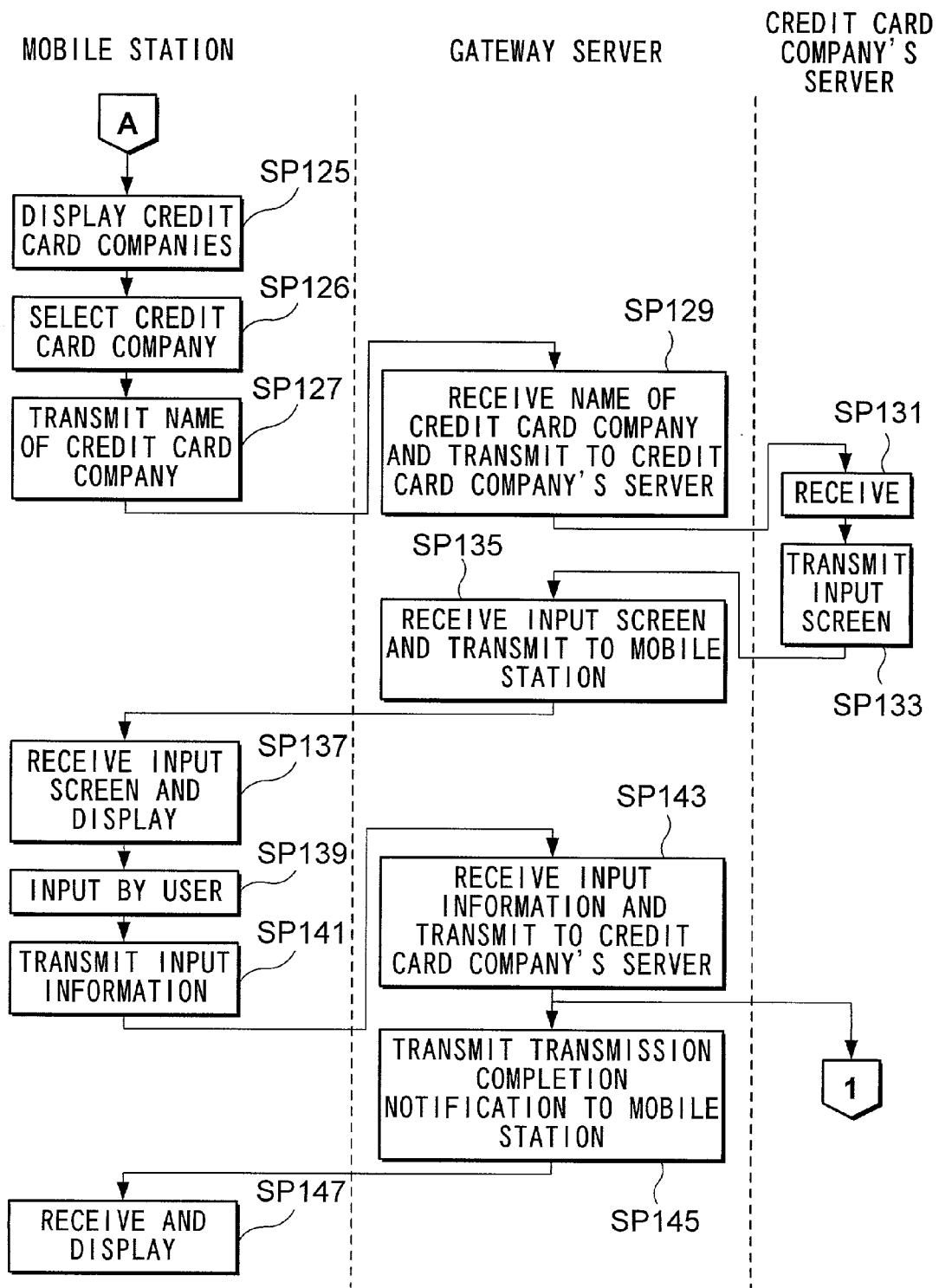

FIG. 13A

PLEASE SELECT A
SERVICE DESIRED

1. CREDIT
2. MOBILE BANKING
3. TRAVEL
      RESERVATION
4. ELECTRONIC MAIL

······ [NEXT]

FIG. 13B

1. CREDIT CONTRACT
2. CREDIT SHOPPING
3. CREDIT HISTORY
4. CREDIT RENEWAL
5. CREDIT CHANGE
6. CREDIT
      CANCELLATION

FIG. 13C

PLEASE ENTER
THE PASSWORD

PASSWORD
[          ]

[ ENTER ]

FIG. 13D

PLEASE SELECT
A CREDIT CARD
COMPANY

1. COMPANY A
2. COMPANY B
3. COMPANY C

[ ENTER ]

FIG. 13E

PLEASE ENTER

1. NAME
[          ]

2. DATE OF BIRTH
[          ]

3. ADDRESS
[          ]

FIG. 13F

RECEIVED THE
APPLICATION.
THE RESULT WILL
BE NOTIFIED
LATER.

[ TO TOP MENU ]

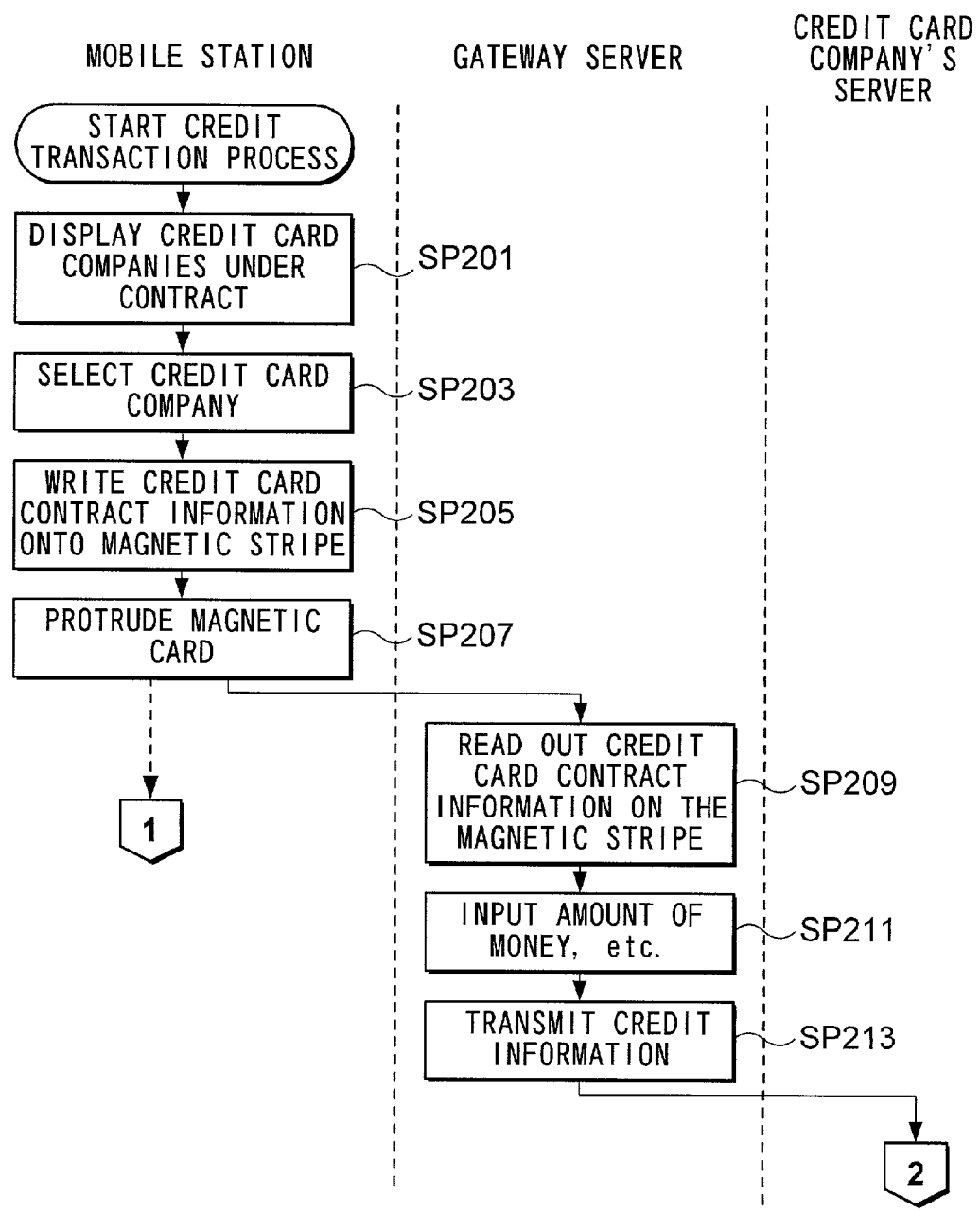

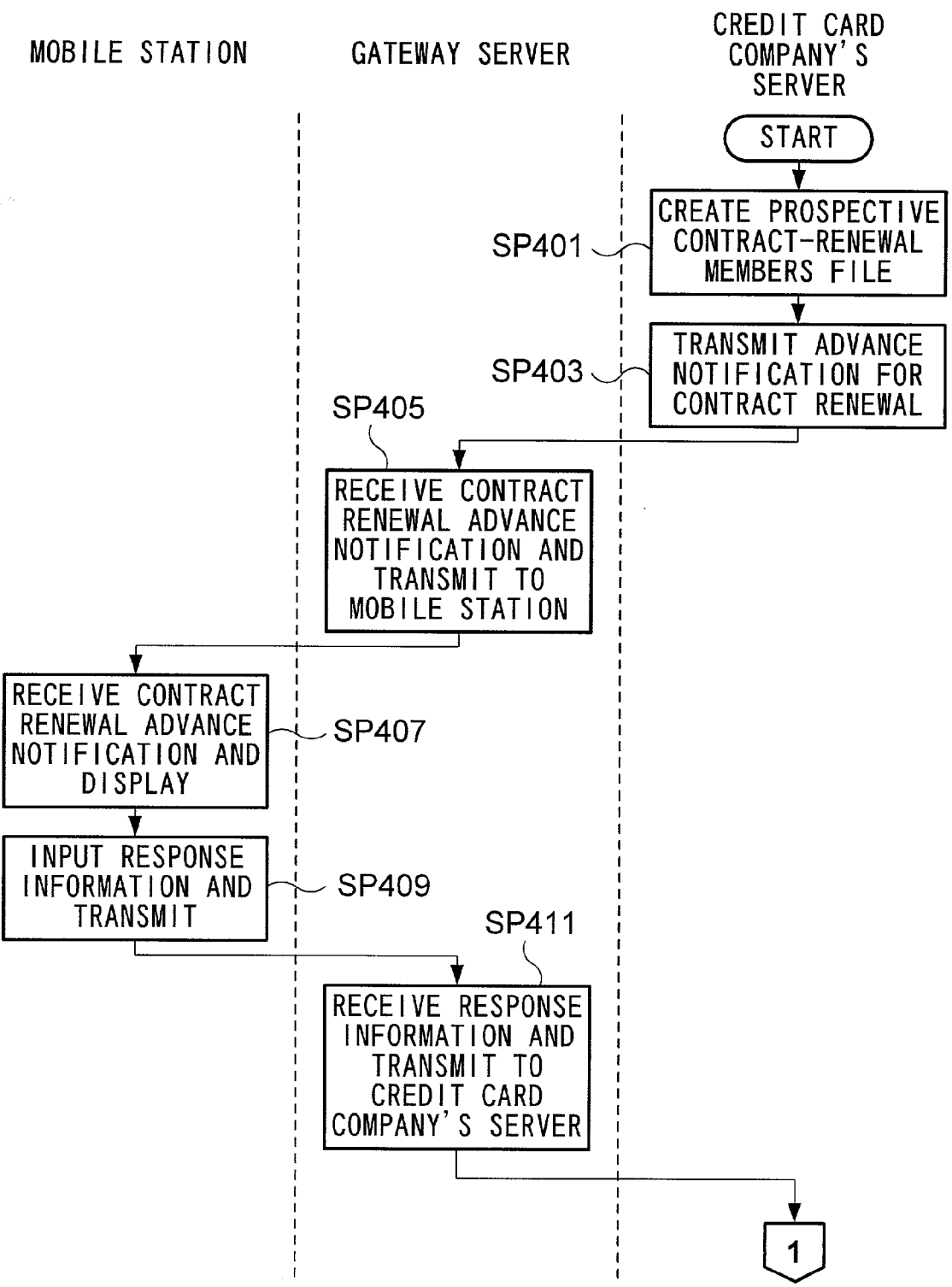

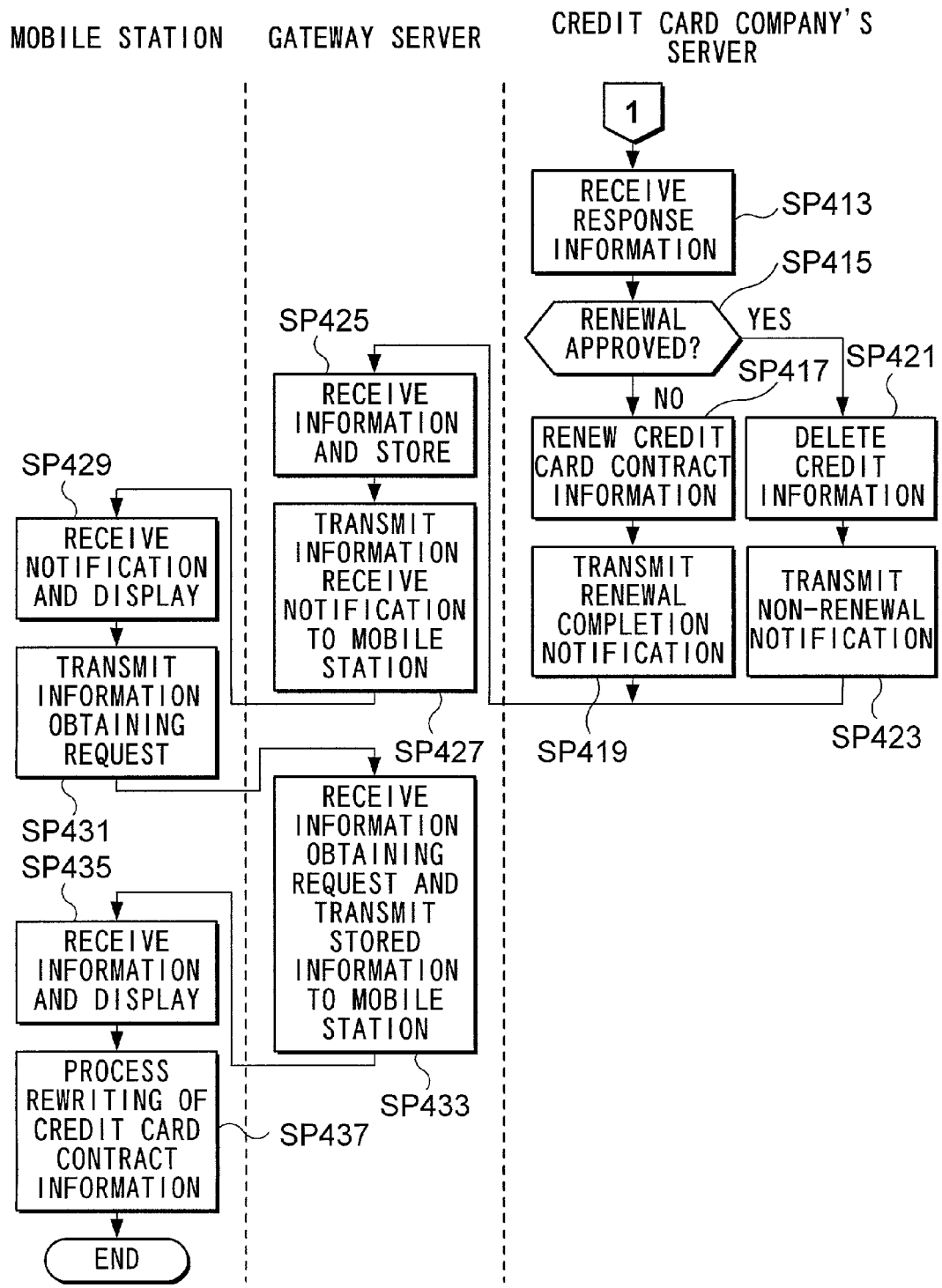

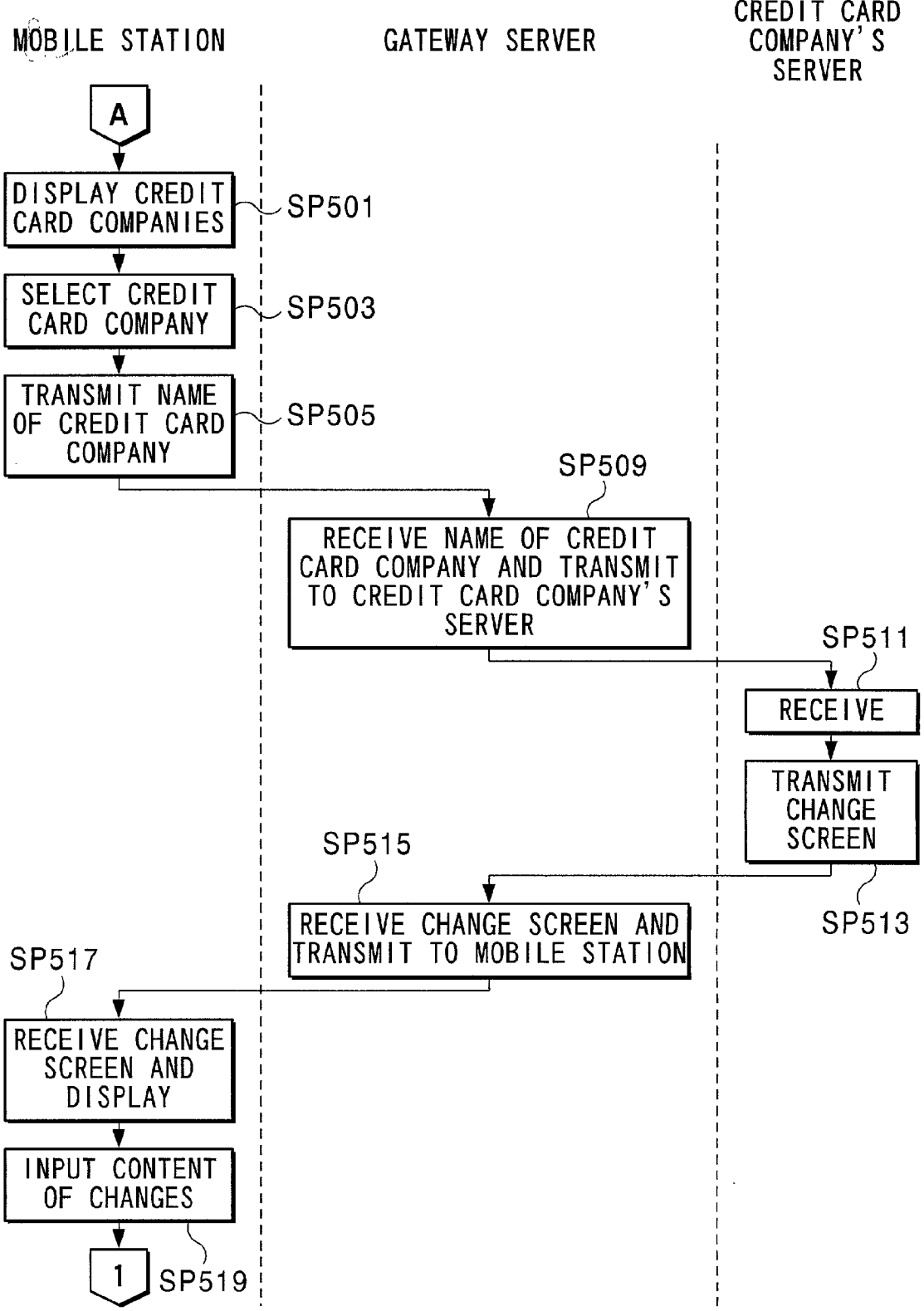

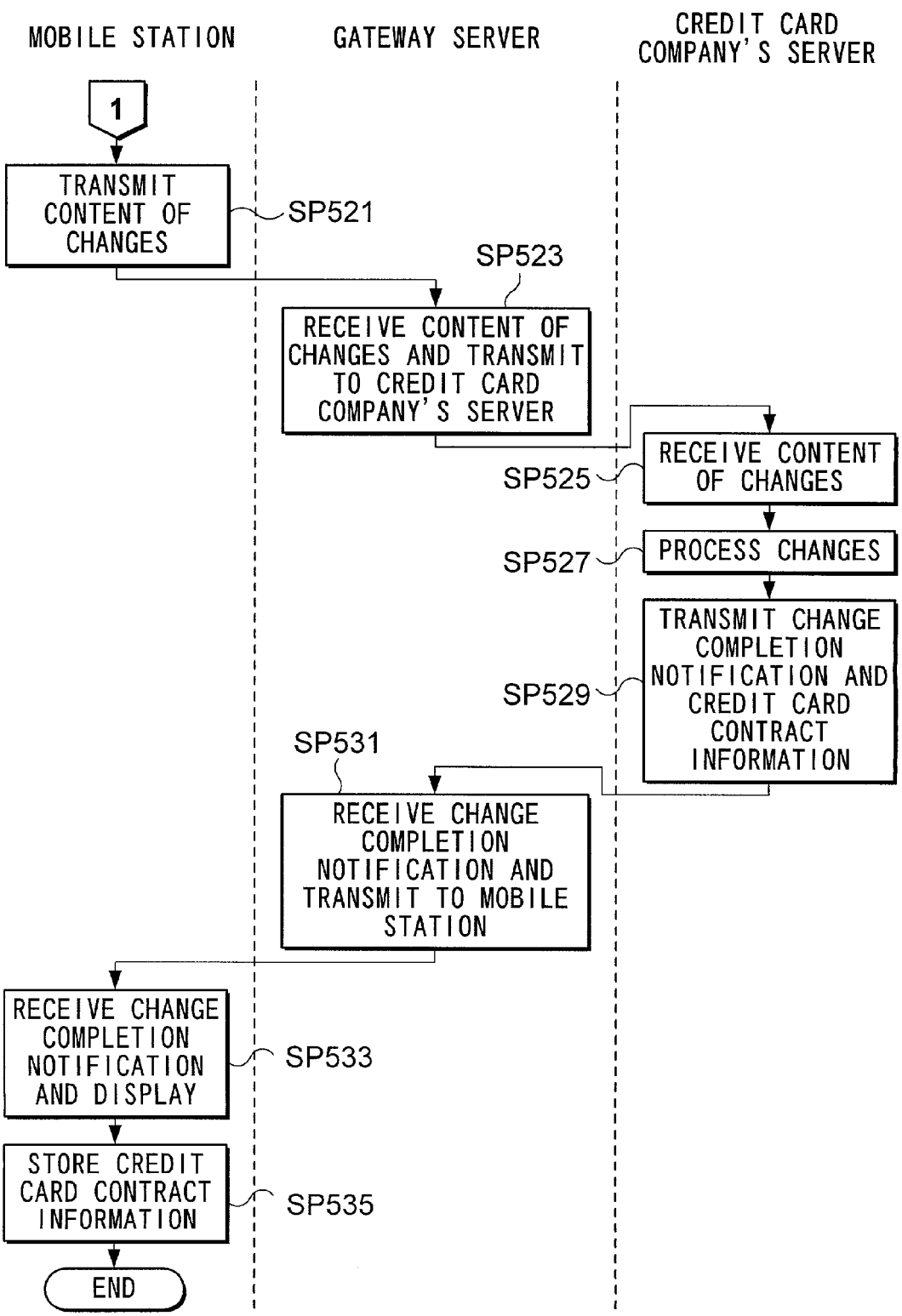

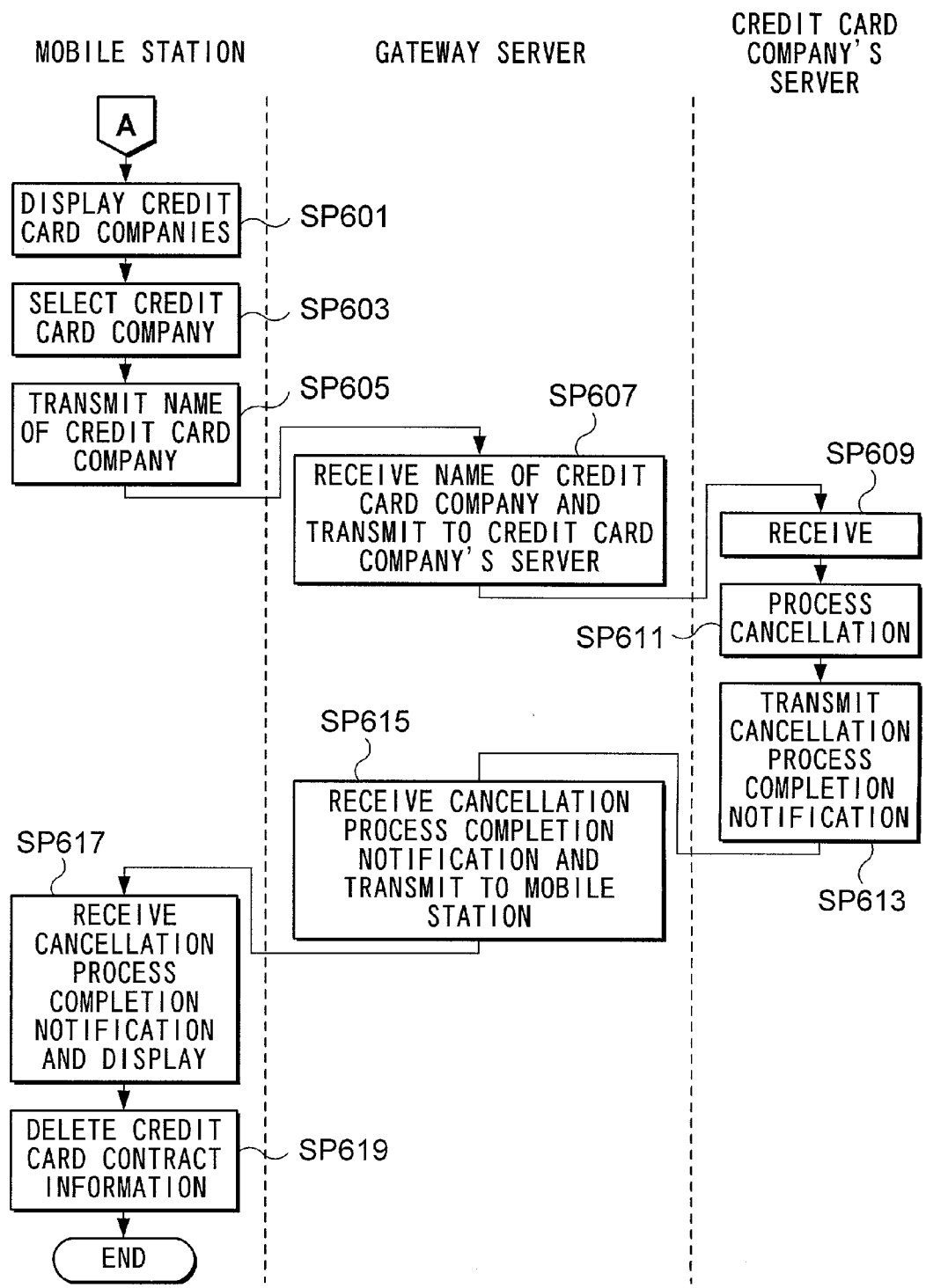

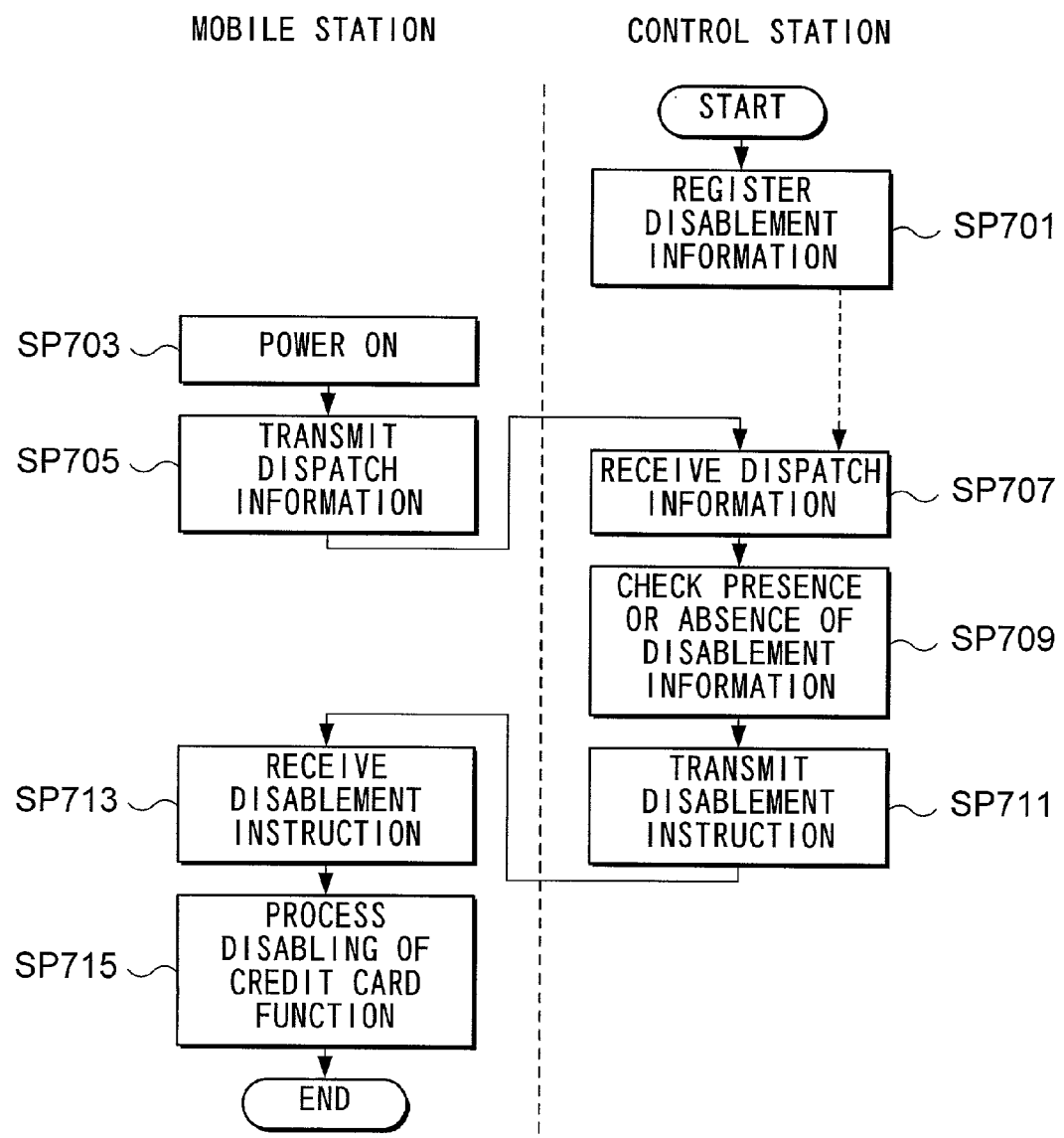

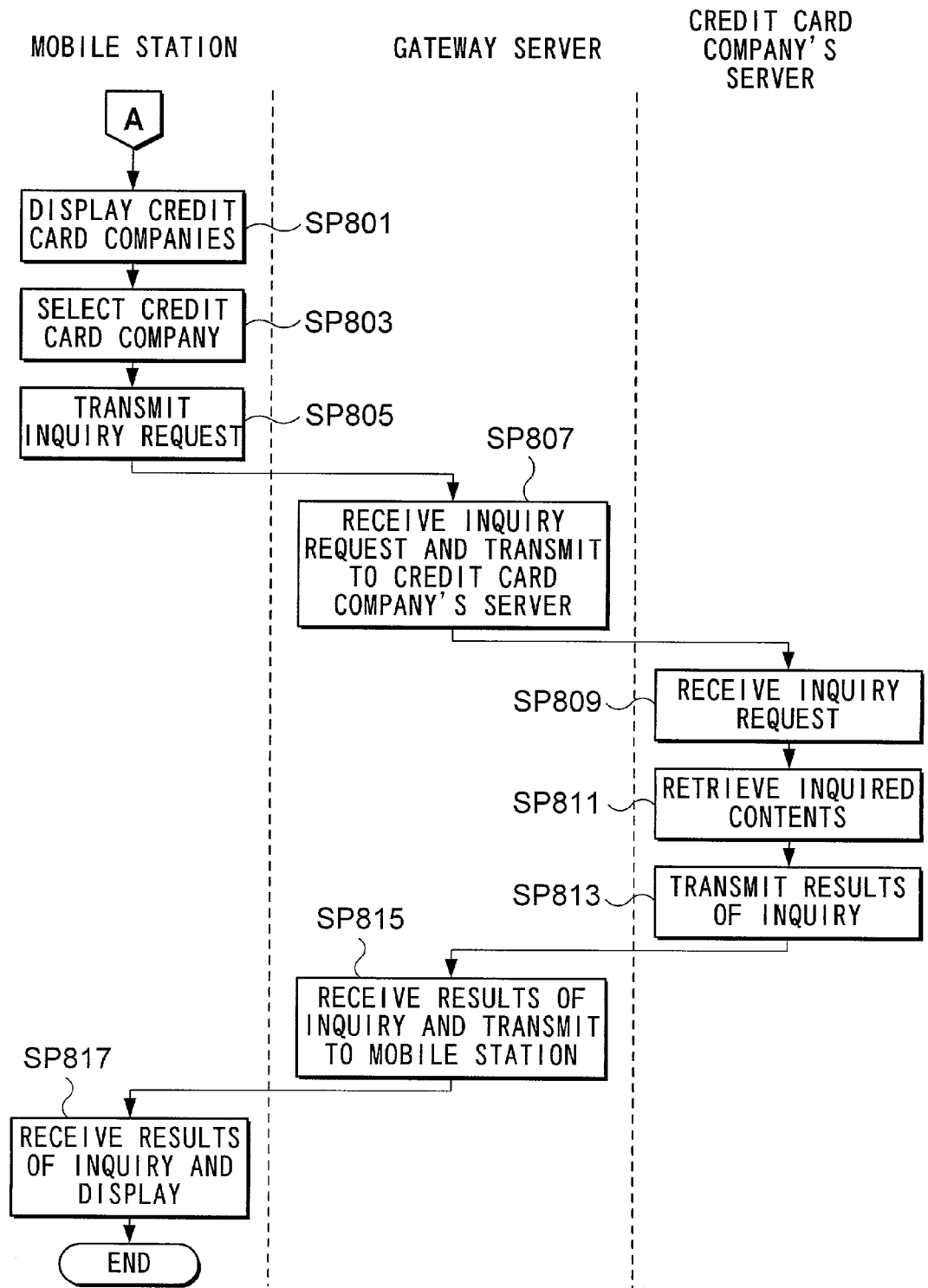

METHOD FOR INHIBITING USE OF MOBILE COMMUNICATION TERMINAL HAVING MEMORY WHERE CARD INFORMATION IS STORED, MOBILE COMMUNICATION NETWORK, AND MOBILE COMMUNICATION TERMINAL

TECHNICAL FIELD

This invention relates to a method for disabling a mobile communication terminal such as a mobile phone; a mobile communication network and a mobile communication terminal.

BACKGROUND ART

Various types of cards have been used such as credit cards and bank cards. Recently, there have been many cases where one person holds a plurality of cards.

When these cards are lost or get stolen, card holders and card issuing institutions must disable these cards so as to prevent a third person who has gained the cards from illegally using them.

In order to do this, when card holders lose cards, they first call card issuing institutions to report the loss of the cards. Subsequently, the card issuing institutions which have received the report register the disabling information of the subject card in their database.

On the other hand, merchants where cards are used make an inquiry for approval or denial of card transactions, and card issuing institutions determine approval or denial of the subject card transaction referring to presence or absence of card disabling information stored in their own database.

Since card holders usually put a plurality of cards together in a purse in many cases, the plurality of cards could get lost or stolen at one time in the case of being lost or stolen.

On the other hand, these cards are issued and managed in their respective card issuing institutions; in the case of losing a plurality of cards at one time, it is troublesome to report to all the card issuing institutions separately for every card.

Further, there are cases where it is hard for cardholders themselves to know immediately which cards are stolen, thereby inhibiting the cardholders from reporting the loss at once.

DISCLOSURE OF INVENTION

This invention is made in consideration of the above-mentioned situations, and has an object to provide a disabling method capable of conducting the card disabling processing quickly, easily, and certainly; a mobile communication network and a mobile communication terminal used for the method.

In order to solve the above-mentioned problem, the present invention provides a method for disabling a mobile communication terminal through a mobile communication network equipped with a wireless communication interface with the mobile communication terminal, the mobile communication terminal storing one or plurality of card information items, comprising the steps of: in response to a request for disabling said mobile communication terminal, storing in a memory disabling information with regard to the requested mobile communication terminal; when there is a call from a mobile communication terminal corresponding to the disabling information stored in the memory, wirelessly transmitting disabling signal for disabling part or all of functions of the mobile communication terminal; receiving the said transmitted signals at said mobile communication terminal; and conducting a process for disabling said mobile communication terminal based on the received disabling signal at said mobile commination terminal.

BRIEF DESCRIPTION OF THE DRAWINGS

FIG. 5 is a diagram showing a configuration of a subscriber database 331.

FIG. 6 is a data format diagram of a registered subscriber information file 304.

FIG. 7 is a diagram showing a configuration of a member database 61.

FIG. 8 is a diagram showing a configuration of a credit database 62.

FIG. 9 is a diagram showing a configuration of a prospective contract-renewal members file 601.

FIG. 10 is a block diagram showing a configuration of a gateway server 32.

FIG. 12A and FIG. 12B cooperate to form a flow diagram showing an operation of the mobile station 100 and the credit transaction system in signing up credit card contracts.

FIG. 13A to FIG. 13J are diagrams showing screen images displayed on a liquid crystal display 132 of the mobile station 100 in signing up a credit card contract.

FIG. 14A and FIG. 14B cooperate to form a flow diagram showing an operation of the mobile station 100 and the credit transaction system in shopping with a credit card function of the mobile station 100 in the shop.

FIG. 16A and FIG. 16B cooperate to form a flow diagram showing an operation of the mobile station 100 and the credit transaction system in renewing credit card contracts.

FIG. 17A and FIG. 17B cooperate to form a flow diagram showing an operation of the mobile station 100 and credit transaction system in making changes in registered member information.

FIG. 18 is a flow diagram showing an operation of the mobile station 100 and the credit transaction system in canceling credit card contracts.

FIG. 19 is a flow diagram showing a flow of an operation in disabling calling and credit card functions of the mobile station 100.

FIG. 20 is a flow diagram showing a flow of an operation in inquiring for credit histories.

BEST MODE OF CARRYING OUT THE INVENTION

[1] First Embodiment

[1. Configuration of the Embodiment]

[1-1. Configuration of Mobile Station]

Figure 1:
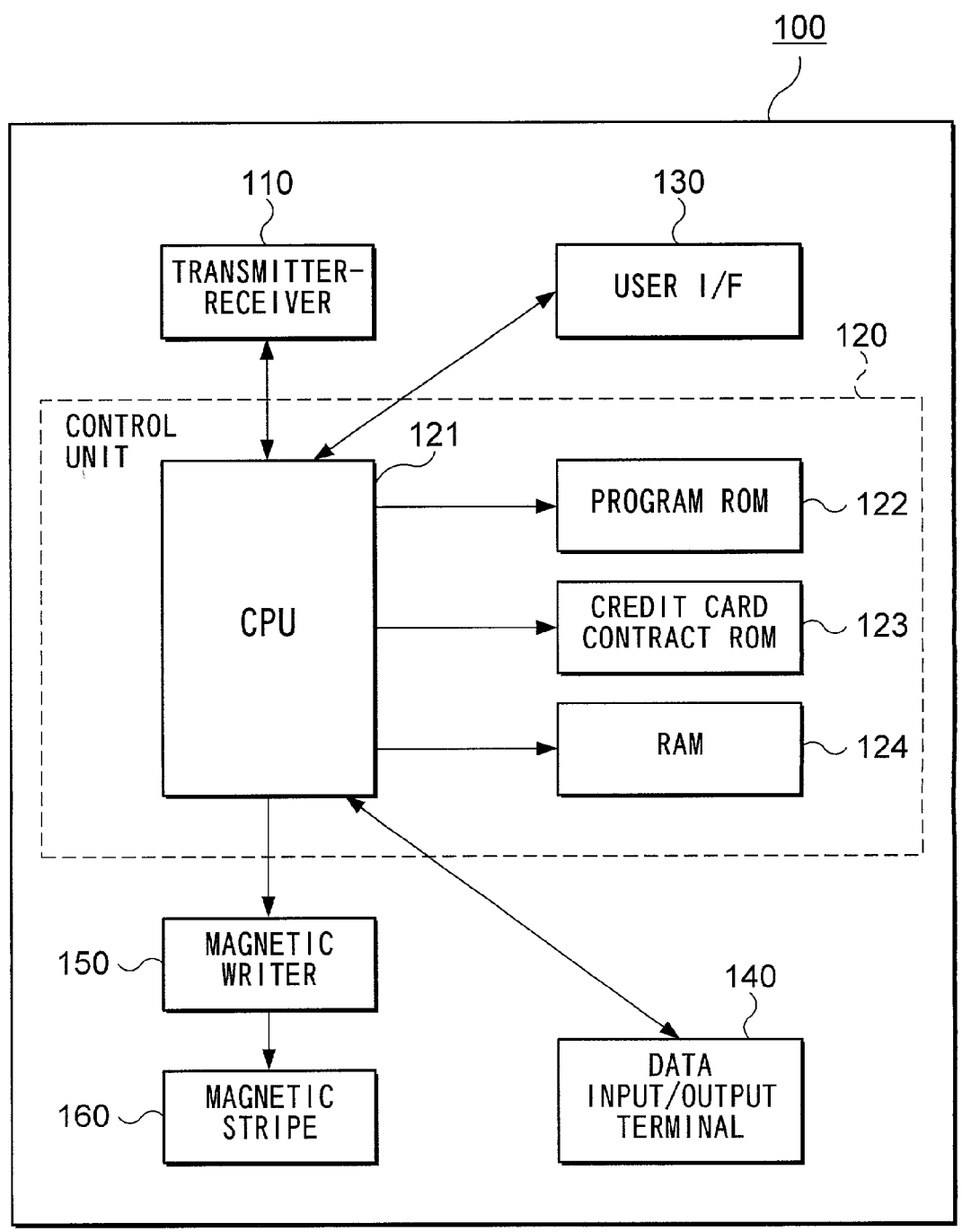
FIG. 1 is a block diagram showing a configuration of a mobile station 100 used for a first embodiment of the present invention.

FIG. 1 is a block diagram showing a configuration of a mobile station 100, a mobile communication terminal used in a first embodiment of the present invention. As shown in the figure, the mobile station 100 has a transmitter-receiver 110, a control unit 120, a user interface 130, a data input/output terminal 140, a magnetic writer 150, and a magnetic stripe 160.

Figure 2:
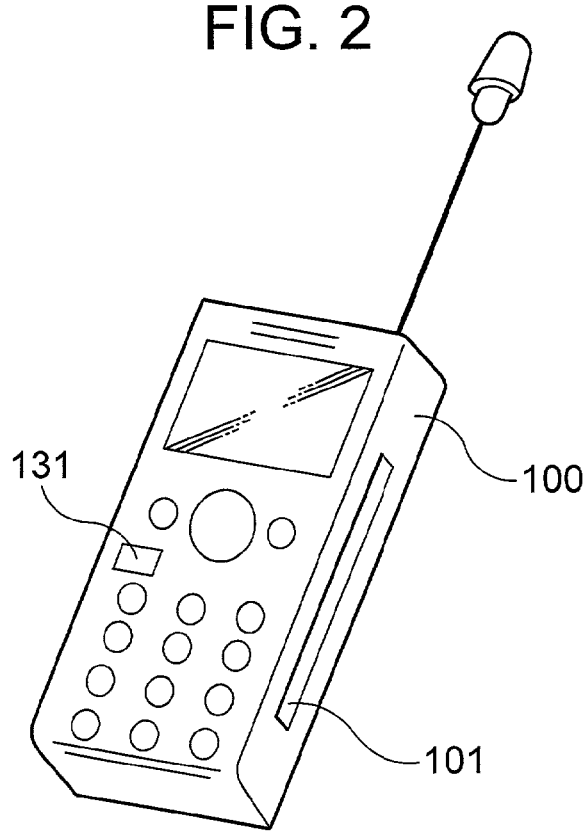
FIG. 2 is a perspective view of the mobile station 100 with a magnetic card 161 retracted.
Figure 3:
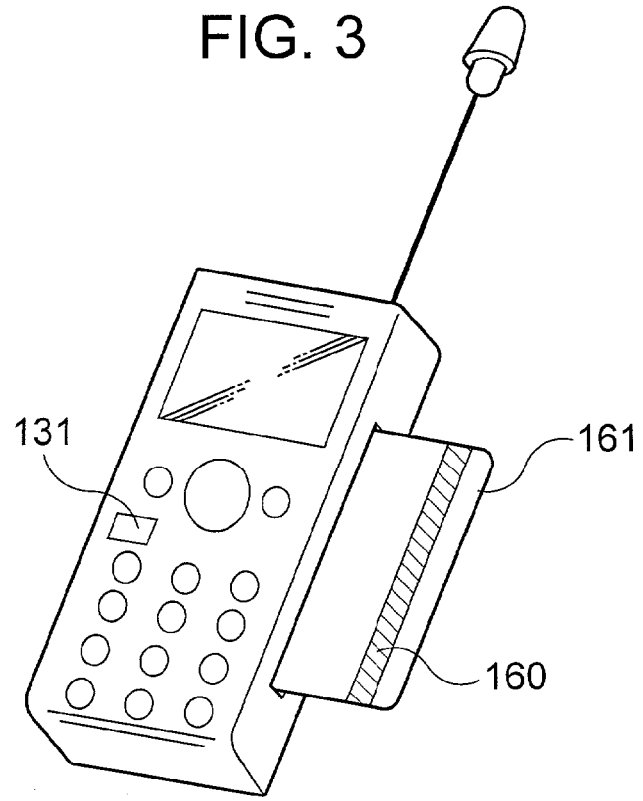
FIG. 3 is a perspective view of the mobile station 100 with the magnetic stripe 160 portion of the magnetic card 161 protruded.

FIG. 2 and FIG. 3 are perspective views showing the appearance of the mobile station 100. This mobile station 100 is equipped with a card retracting/protruding key 131, a magnetic card 161 that has a magnetic stripe 160 shown in FIG. 1, and a slot 101 for retracting or protruding the magnetic card 161. The user operates the card retracting/protruding key 131, thereby permitting the magnetic card 161 retracted in the slot 101 as shown in the FIG. 2, or the magnetic stripe 160 portion of the magnetic card 161 protruded out of the slot 101.

In FIG. 1, the transmitter-receiver 110 handles wireless communications with base stations of a mobile communication network which provides the mobile telephone communication service and the mobile packet communication service.

The control unit 120 controls each of the sections of the mobile station 100, and comprises a CPU 121, a program ROM 122, a credit card contract ROM 123, and a RAM 124. The operational modes in this mobile station 100 include a calling mode for performing phone-to-phone conversations via the mobile communication network, and a packet communication mode for performing packet communications via the mobile packet communication network. Users can set a desired mode. The control unit 120 controls each of the sections of the mobile station 100 according to set state of each of these modes.

The RAM 124 is used as a work area for the CPU 121 or a user data area for storing such information as phone directory data.

The credit card contract ROM 123 is a memory for storing one or plurality of card information items. In the present embodiment, credit card contract information on profiles of a credit card contract under which a user of the mobile station 100 is with a credit card company are stored as card information. These credit card contract information are given from the credit card company to its members, including, for example, the name of the credit card company with which a user is under contract, a URL of the server of the credit card company (as will hereinafter be described), a credit-card number, an identification number given to each credit card usually consisting of 16-digit numerals, the expiration date of the credit card, and the member's name. In a case where a user of the mobile station 100 is under contract with a plurality of credit card companies, the credit card contract information corresponding to the plurality of credit cards are stored in this credit card contract ROM 123.

This credit card contract ROM 123 is accessible only from a special ROM reader/writer or a private server owned by a credit card company. In the case of being accessed from a special ROM reader/writer to the credit card contract ROM 123, write information to the credit card contract ROM 123 are transmitted to the control unit 120 from the ROM reader/writer connected to the data input/output terminal 140. The control unit 120, after ensuring the validity of the accessing ROM reader/writer, writes the write information into the credit card contract ROM 123. Also, in the case of being accessed from a private server to the credit card contract ROM 123, write information to the credit card contract ROM 123 are transmitted to the control unit 120 from the server via a network such as the mobile packet communication network. The control unit 120, after ensuring the validity of the accessing server, writes the write information into the credit card contract ROM 123. The control unit 120, when it detects any means other than the above that tries to access the credit card contract ROM 123, carries out the disabling operation of the mobile station 100 itself.

The program ROM 122 stores control programs. The CPU 121 reads out these programs and carries out various types of control processes. These control programs include various programs described below as well as programs for the calling function usually stored in a mobile station of the existing mobile communication system.

These control programs include a document data viewing software, known as a browser. The CPU 121 reads out the browser from the program ROM 122 to carry it out, which permits the acquiring of data in the HTML form from various information providing servers connected to the internet via, for example, a gateway server 32 shown in the FIG. 4. This gateway server 32 is a computer system established at a mobile packet gateway relaying/switching center for interconnecting the mobile packet communication network 30 and other networks such as the Internet 70. The gateway server 32 performs protocol conversion for performing communications among a plurality of networks, each of which uses a different protocol. The acquiring of HTML data by the mobile station 100 is performed by transmitting an acquisition request specifying the URL of a resource to a server providing information via this gateway server 32 and completed by storing in the RAM 124 the HTML data transmitted, in response to the request, from the server providing the information.

In addition, these control programs include a program for storing credit card contract information in the credit card contract ROM 123. This program also reads out, makes changes, or deletes the credit card contract information stored in the credit card contract ROM 123.

The control programs further include a program for controlling the magnetic writer 150, thereby writing in or deleting from the magnetic stripe 160 the credit card contract information read out from the credit card contract ROM 123; and a program to transmit to a merchant's server 80C, 80D, as will hereinafter be described, the credit card contract information that have been read out from the credit card contract ROM 123.

The control programs also include a program for, when the mobile station 100 is turned on, transmitting information that includes information to the effect that the power is on and an identification number for the mobile station 100 via a particular channel.

Also, as mentioned earlier, the control programs include a program, when it detects any attempt to access the credit card contract ROM 123 by an unjustified means, for disabling the mobile station 100 itself.

The magnetic writer 150 writes credit card contract information given from the control unit 120 into the magnetic stripe 160, or deletes credit card contract information from the magnetic stripe 160.

The magnetic stripe 160 is similar to magnetic stripes widely used for existing credit cards. Therefore, credit card contract information written in the magnetic stripe 160 is readable by a currently widely-used credit authentication terminal (CAT) for reading magnetic stripes.

This magnetic stripe 160 is provided on a card made of plastic that is retractable in the mobile station 100, the magnetic card 161 in FIG. 3. This magnetic card 161 is retracted or protruded by the card retracting/protruding key 131 established on the keypad of the mobile station 100, or by a specified key operation using an existing keyboard (refer to FIG. 2 and FIG. 3). The magnetic card 161 is usually retracted inside the mobile station 100, but when doing shopping, the portion of the magnetic stripe 160 is protruded outside the mobile station 100. The back side of this magnetic card 161 has a section for a user's signature in the same way as existing credit cards.

The user interface 130 includes a liquid crystal display 132, a keypad by which users perform various input operations, and a microphone and a speaker for users to hold conversations.

[1-2. Configuration of Credit Transaction System]

Figure 4:
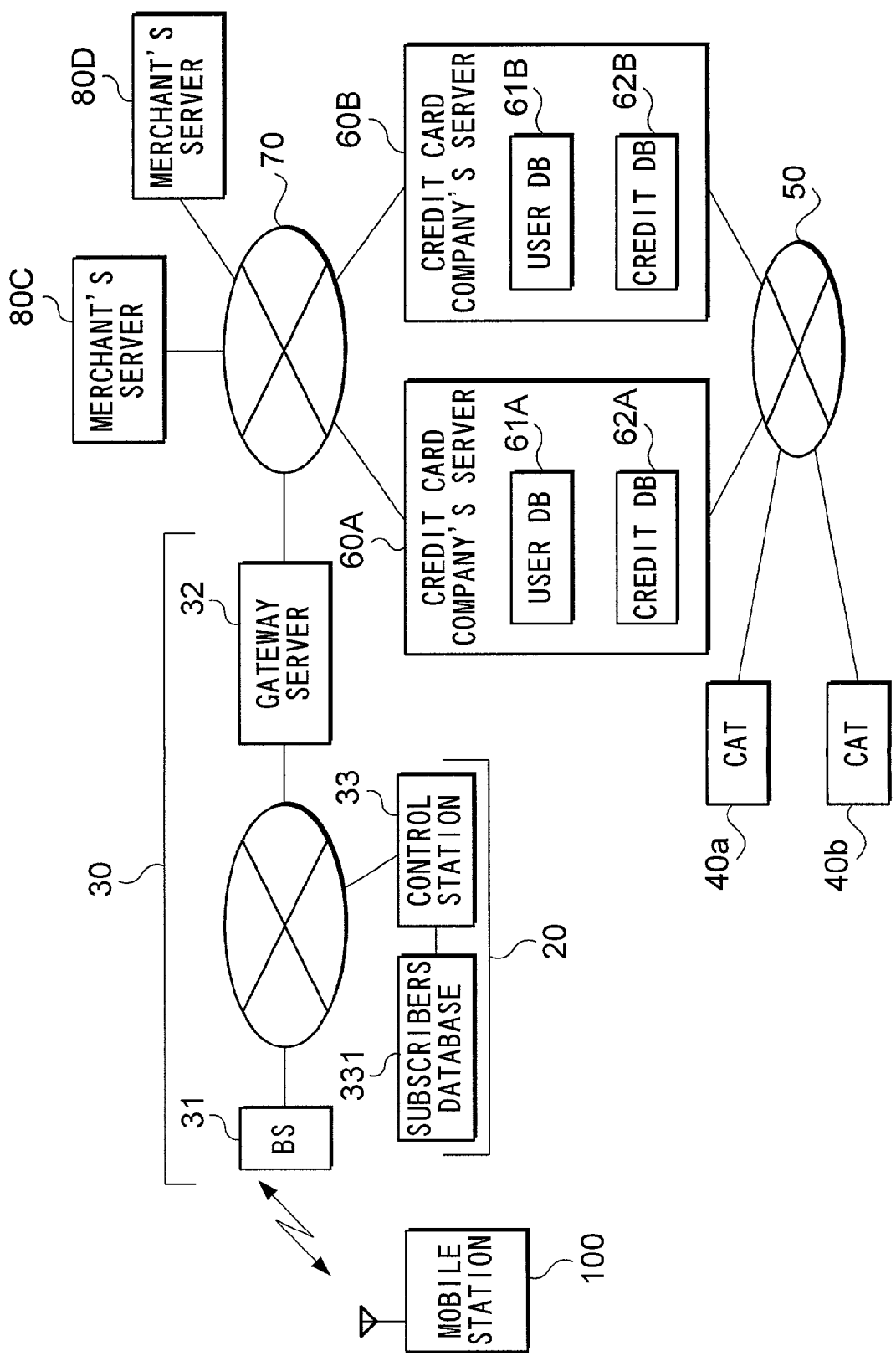
FIG. 4 is block diagram showing a configuration of a credit transaction system using the mobile station 100.

FIG. 4 is a block diagram showing a configuration of the credit transaction system using a mobile station 100. This credit transaction system comprises the mobile station 100, a mobile telephone network 20, and a mobile packet communication network 30, CATs 40a, 40b, . . . , the Credit and Finance Information System (CAFIS) network 50, credit card company's servers 60A, 60B, . . . , the Internet 70, and merchant's servers 80C, 80D, . . . .

A user registered as credit card members carry the mobile station 100. The mobile station 100 is capable of connecting to the mobile telephone network 20 and the mobile packet communication network 30.

The mobile telephone network 20 provides general calling services using mobile stations, and the mobile station 100 receives the services over this mobile telephone network 20. This mobile telephone network 20 comprises many base stations 31 spaced out at a certain interval within communication areas, a switching unit for performing circuit-switching (not shown), a control unit 33 for controlling the inside of the network, and communication cables (not shown).

This control unit 33 is equipped with a subscribers database 331 that stores a variety of information relating to subscribers who use the communication services. The above-mentioned base stations 31, the switching unit, the control unit 33, and communication cables are shared by the mobile packet communication network 30.

FIG. 5 is a diagram showing a data format of the subscriber database 331. As shown in the figure, the subscriber database 331 stores various types of information for each subscriber of the mobile telephone network 20, that is, for each user of the mobile station 100, the information including the phone number of the mobile station 100 owned by the subscriber, his/her name, sex, date of birth as well as disabling information that orders the disabling the mobile station 100 and its credit card function. A disablement flag is registered in a disabling information cell for a user with the mobile station 100 and its credit card function are disabled.

As shown in the FIG. 4, the mobile packet communication network 30 includes a gateway server 32 in addition to the above-mentioned base station 31, switching unit (not shown), control unit 33, and communication cables.

The gateway server 32 performs the inter-conversion of a transmission protocol for the mobile packet communication network 30 and the TCP/IP, a standard communication protocol of the Internet 70. In addition, the gateway server 32 controls various types of message delivery processings performed among the mobile station 100, the credit card company's server 60A, 60B, . . . , and the merchant's server 80C, 80D, . . . .

FIG. 10 is a block diagram showing a configuration of the gateway server 32. This gateway server 32 has a control unit 301, a subscriber information manager 302, and a data delivery manager 303.

The control unit 301 controls each of the sections of the gateway server 32 and also functions as an interface among protocols such as to perform protocol conversion between the mobile packet communication network 30 and another network such as the Internet 70.

The control unit 301 stores encryption algorithm such as Secure Sockets Layer (SSL). Performing communication with the credit card company's server 60A, 60B, . . . and the merchant's server 80C, 80D, . . . using this encryption algorithm protects the communication.

The subscriber information manager 302 stores and manages a registered subscriber information file 304 that can be obtained referring to the subscriber database 331 of the control unit 33. FIG. 6 is a diagram showing a data format of the registered subscriber information file 304. As shown in the figure, the registered subscriber information file 304 stores, for each subscriber of the mobile packet communication network 30, that is, for each user of the mobile station 100, a variety of data such as the phone number of the mobile station 100 owned by the subscriber, his/her name, sex, date of birth, the storage location of data and electronic-mail messages delivered to the user in the data delivery manager 303, and a password pre-registered by the user.

The control unit 301 performs user authentication of a user of the mobile station 100 that has accessed to the gateway server 32 in order to use the specified service. The control unit 301 of the gateway server 32 handles this user authentication by matching a password entered by the user on the mobile station 100 and the password within the registered subscriber information file 304.

The data delivery manager 303 relays the delivering of electronic-mail messages and various data among users of two or more mobile station 100; between a user of the mobile station 100 and a user of another network such as the Internet 70; between a user of the mobile station 100 and a credit card company's server 60A, 60B, . . . ; and between a user of the mobile station 100 and a merchant's server 80C, 80D, . . . .

To illustrate, the data delivery manager 303 receives a communication request including the destination and the content of a communication from a mobile station 100 or a credit card company's server 60A, 60B, . . . , and transmits the contents to the destination. Alternatively, the data delivery manager 303, after receiving the communication request, once stores the received contents, and makes a notification to the effect that the contents have been stored, to the terminal of the requested destination (for example, the mobile station 100). Subsequently, upon receiving the request for obtaining the contents, the data delivery manager 303 transmits the stored contents to the terminal. For this purpose, the data delivery manager 303 has a memory (not shown) inside for storing the communication contents temporarily.

This memory stores a variety of service information to be transmitted to the mobile station 100 and displayed as a menu on the liquid crystal display 132 of the mobile station 100. The service information are data in the HTML format, data for each service item including the URL of a server which carries out each service.

This memory also stores information on merchants where credit card purchases can be made over the mobile packet communication network 30. The merchants information are also data in the HTML format, and data for each merchant includes the URL of the server of each merchant. This merchants information are transmitted to the mobile station 100 and displayed on the liquid crystal display 132 of the mobile station 100.

When a user requests a particular service using the mobile station 100, the mobile station 100 transmits a URL that is included in data for the service item to the gateway server 32, and the gateway server 32, based on the URL received, makes an access to the server which implements the service. When a user makes a purchase with a credit card at a certain merchant via the mobile packet communication network 30, a URL written in the HTML data format is used as well.

A number of CATs 40a, 40b, . . . shown in FIG. 4 are established at merchants and cash dispenser (CD)s. The CATs 40a, 40b, . . . are equipped with a magnetic reader (not shown) and capable of reading the credit card information recorded on the magnetic stripe 160 of the mobile station 100. The CATs 40a, 40b, . . . are also equipped with an input interface (not shown), and through this input interface salespersons in the shop can enter a certain information item such as the amount of purchase. The CATs 40a, 40b, . . . are connected to a private network, the CAFIS network 50, to which the credit card contract information read from the magnetic stripe 160 and information such as the amount of transaction, transaction date, and merchant with regard to the credit card purchase are transmitted. These information given from the CATs 40a, 40b, . . . to the CAFIS network 50 will be referred to as credit information hereinafter.

The CAFIS network 50 is formed by connecting a number of CATs 40a, 40b, . . . and credit card company's servers 60A, 60B, . . . . This CAFIS network 50 is a nationwide network that connects credit card companies, distribution companies, and financial institutions, the CAFIS control center (not shown) centralizing the network.

This CAFIS network 50 transmits various credit information that result from such actions as shopping and cash advance with credit card by a user, to one of the credit card company's servers 60A, 60B, . . . which provides a contract. It also transmits information on approval or denial of the credit card use from the one of the credit card company's servers 60A, 60B, . . . to one of the CATs 40a, 40b, . . . .

The server 60A, 60B, . . . is established at each credit card company, and connected to the CAFIS network 50 and the Internet 70. This credit card company's server 60A, 60B, . . . comprises a member database 61A, 61B, . . . for storing such information as member profiles and credit card contract information, and a credit database 62A, 62B, . . . for storing members' credit histories and payment settlement information.

FIG. 7 shows a data format of the member database 61A, 61B, . . . , and FIG. 8 shows a data format of the credit database 62A, 62B, . . . .

As shown in FIG. 7, the member database 61A, 61B, . . . stores member profiles such as each user's name, age, address, phone number, employment, and annual income, and credit card contract information relating to each credit card contract such as card number, expiration date, and credit limit. These member profiles information are reported by users at the time of signing up contracts, and changed anytime when changes are reported from the users. Further, these credit card contract information are information granted to each of the contracts by a credit card company once the credit card membership is approved, and part of the information is updated every time the expiration date comes.

In addition, as shown in FIG. 8, the credit database 62A, 62B, . . . stores credit history such as transaction dates of credit purchases and cash advances, merchants, and amount of transactions, and credit settlement information such as amount paid for each billing cycle. This credit history (the transaction dates, merchants, and amount of transactions) are information transmitted from the CAT 40a, 40b, . . . and the merchant's server 80C, 80D, . . . to the credit card company's server 60A, 6DB, . . . . Then, the credit card company's server 60A, 60B, . . . totals amount of payment for each billing cycle based on the information on dates and amounts of transactions, and stores the totaled amount as credit settlement information.

The main functions of the credit card company's server 60A, 60B, . . . are 1) the processing of credit card contracts (including admission, renewal, changes, and cancellation), 2) the determination on approval or denial of credit card contracts and purchases, 3) the accumulation of various information on credit card contracts and credit card transactions, 4) the settlement amounts on credit-card transactions, and 5) the provision of various information for members, each of which will be described below in detail.

First of all, the credit card company's server 60A, 6 0B, . . . pre-stores an entry screen to be transmitted to the mobile station 100 for signing up a credit card contract and a change screen to be transmitted to the mobile station 100 for making changes in contracts; upon receiving a credit card contract request, an entry screen corresponding to the request is provided to the mobile station 100 through the Internet 70 and the gateway server 32.

Furthermore, the credit card company's server 60A, 60B, . . . creates and stores a prospective contract-renewal members file 601A, 601B, . . . . This prospective contract-renewal members file 601A, 601B, . . . stores information on members whose contract renewal is approaching.

Figure 9:
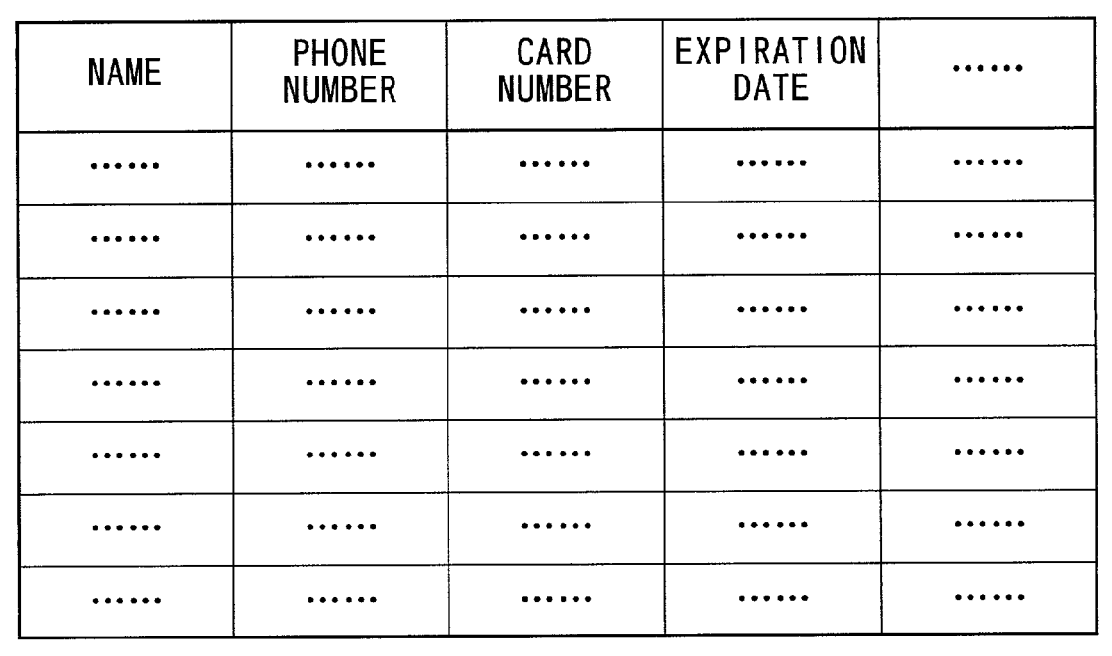

FIG. 9 shows a data format for the prospective contract-renewal members file 601A, 601B, . . . . As shown in this figure, the prospective contract-renewal members file 601A, 601B, . . . stores data such as each member's name, credit number, phone number, and date of expiration. The credit company's server 60A, 60B, . . . refers to the expiration dates of credit card contracts stored for each member in the member database 61A in a certain cycle (for example, every 24 hours) to extract users whose contracts are about to expire (for example, within one week) and obtains information on the extracted users from the member database 61A, 61B, . . . to be stored in the prospective contract-renewal members file 601A, 601B, . . . .

The second function of the credit company's server 60A, 60B, . . . is the determination as to approval or denial of credit-card contracts or transactions. The credit company's server 60A, 60B, . . . pre-stores criteria for examining approval or denial of credit card contracts, receives from the mobile station 100 the contents entered by the user according to the entry screen for sign-up, and examines whether or not the credit card contract can be approved based on the entered contents and examination criteria. As a result of the examination, if the credit card contract is approved, credit card contract information to be stored in the magnetic stripe 160 of the mobile station 100 is generated and given to the mobile station 100.

In addition, when a user performs shopping with a credit card, this credit company's server 60A, 60B, . . . decides whether or not the shopping with the credit card taking place is valid by using credit information given from the CAT 40a, 40b, . . . (or from the merchant's server 80C, 80D, . . . ) and various information stored in the member database, 61A, 61B, . . . ; and transmits the results thereof to the CAT 40a, 40b, . . . (or the merchant's server 80C, 80D, . . . ) as credit approval or denial information.

Thirdly, the credit company's server 60A, 60B, . . . stores user profiles and credit card contract information relating to the contract in the member database 61A, 61B, . . . , and data such as credit card purchases that have taken place are stored in the credit database 62A, 62B, . . . .

Fourthly, the credit company's server 60A, 60B, . . . , via the CAFIS network 50, notifies credit payment information to a financial institution having a credit payment transfer account and performs a transfer of the credit payment.

Finally, the credit company's server 60A, 60B, . . . obtains information desired by a user from among the information stored in the member database 61A, 61B, . . . and the credit database 62A, 62B, . . . , and provides the mobile station 100 with them through the Internet 70 and the mobile packet communication network 30.

This credit company's server 60A, 60B, . . . stores an encrypted transmission algorithm such as Secure Sockets Layer (SSL), and handles communication thereby with the gateway server 32 and the merchant's server 80C, 80D, . . . , thereby protecting the contents of transmission.

The merchant's server 80C, 80D, . . . in FIG. 4 is a server which provides so called virtual shops that permit users to shop online. The merchant's server 80C, 80D, . . . stores shopping screens to be displayed on the mobile station 100 as data in the HTML format. The shopping screen data include information related with commercial products sold to the user such as the name of the products, product descriptions, and prices.

The merchant's server 80C, 80D, . . . receives a credit card shopping request from a user of the mobile station 100, provides a shopping screen thereto, and handles the processing related to the credit card shopping in cooperation with one of the credit company's server 60A, 60B, . . . which performs a payment settlement for the credit card shopping.

This merchant's server 80C, 80D, . . . stores an encrypted transmission algorithm such as SSL, and handles communication thereby with the gateway server 32 and the credit company's server 60A, 60B, . . . , thereby protecting the contents of transmission.

[2. Operation]

Next, operations of the present embodiment will be described below, classified into the following operational modes.

1. Signing up for a credit card contract
2-a. Shopping with credit card over the counter
2-b. Shopping with credit card through the mobile packet communication network 30
3. Renewing a credit card contract
4. Making changes in registered member information
5. Canceling a credit card contract
6. Disabling a mobile station 100 and its credit function
7. Inquiring one's own credit history

[2-1. Signing Up for Credit Card Contract]

FIG. 11A, FIG. 11B, FIG. 12A, and FIG. 12B are flow charts showing an operation when a user signs up for a credit card contract with a mobile station 100.

FIGS. 13A to 13J are diagrams of screen images displayed on the liquid crystal display 132 of the mobile station 100, and shown chronologically corresponding to the operation indicated in FIG. 11A, FIG. 11B, FIG. 12A, and FIG. 12B.

The operation in signing up for a credit card contract will be described hereinafter in reference to FIG. 11A, FIG. 11B, FIG. 12A, and FIG. 12B.

Firstly, in step SP101, a user initiates a call to the gateway server 32 at a predetermined phone number and requests the start of a communication in the packet communication mode.

In step SP 102, the gateway server 32, upon receiving the packet communication mode starting request, starts communication in the packet communication mode with the user at the other end, and transmits to the mobile station 100 service menu screen data stored within itself.

In step SP 103, the mobile station 100 receives the service menu screen data and displays the service menu on the liquid crystal display 132. FIG. 13A is a diagram of a screen image displayed on the mobile station 100 at this time.

In step SP 104, the user selects by a key operation a desired service from among the displayed service menu items. In this case, on the screen indicated in FIG. 13A, the user moves a cursor on the "credit" to select it. Then, the mobile station 100 transmits to the gateway server 32 the selected service request, in this case, the "credit."

In step SP105, the gateway server 32, in response to the received service request, transmits to the mobile station 100 service menu screen data designating more detailed contents of the service, in this example, detailed contents regarding the "credit."

In step SP106, the mobile station 100 receives the detailed service menu screen data and displays the service menu on the liquid crystal display 132. FIG. 13B is a diagram of a screen image displayed on the mobile station 100 at this time.

In step SP107, the user selects by a key operation a desired service from among the displayed detailed service menu items. In this case, on the screen indicated in FIG. 13B, the user moves a cursor on the "credit card contract" to select it. Then, the mobile station 100 transmits to the gateway server 32 the selected detailed service request, in this case, "credit card contract."

The above-mentioned service menu screen data are transmitted to the mobile station 100 multiple times until the user finally specifies a desired service.

In step SP108, the gateway server 32 receives the detailed service request and transmits, to the mobile station 100, password entry screen data for the user to enter a password.

In step SP109, the mobile station 100 receives the password entry screen data, and a password entry screen is displayed on the liquid crystal display 132. The user enters a password pre-registered in the gateway server 32 in the password entering section of the password entry screen.

FIG. 13C is a diagram of the password entry screen displayed on the mobile station 100 at this time. The user enters the password in the password entering section and moves a cursor to select "enter".

In step SP111, the mobile station 100 transmits the password information entered by the user to the gateway server 32. In step SP113, the gateway server 32 receives the password information.

In step SP 115, the gateway server 32 performs user authentication by matching the password received from the mobile station 100 and the password of the mobile station 100 stored in the subscriber information manager 302.

In step SP117, based on a result of the user authentication, it is determined whether the user is valid or not. When it is approved as a valid user by the determination in step SP117, the routine advances to step SP119, and the gateway server 32, in response to a final service request from the user (a credit card contract request), transmits to the mobile station 100 next screen information to be displayed on the mobile station 100.

On the other hand, if it is not approved as a valid user by the determination in step SP117, the routine proceeds to step SP121, and the gateway server 32 transmits to the mobile station 100 a service denial notification indicating that the credit card contract request from the user cannot be accepted.

Then, in step SP123, the mobile station 100 receives the information transmitted from the gateway server 32. Subsequently in FIG. 12A, in step SP125, a next screen received by the mobile station 100 is displayed on the liquid crystal display 132. In this case, a list of names of credit card companies for which the user can sign up is displayed on the liquid crystal display 132.

FIG. 13D is a diagram of the screen displayed on the mobile station 100 at this time. In the case of receiving the service denial notification, the mobile station 100 displays the notification on its liquid crystal display 132 (not shown), and the procedure ends.

In step SP126, the user selects by a key operation a desired credit card company from among the displayed credit card companies. In other words, the user moves a cursor on a desired credit card company on the screen shown in FIG. 13D to select "enter." It is assumed herein that the credit card company A has been selected as an example.

In step SP127, the mobile station 100 transmits to the gateway server 32 the name of the selected credit card company (company A) and the URL of the server 60A thereof.

In step SP129, the gateway server 32 receives the name of the credit card company (company A) and its URL, and transmits a credit card contract request to the credit card company's server 60A based on the received URL.

The gateway server 32 at this time protects by SSL the contents to be transmitted to the credit card company's server 60A. Also in the following description of operations, the contents of communications are protected by SSL when communications are performed among the gateway server 32, the credit card company's server 60A, 60B, . . . , and the merchant's server 80C, 80D, . . . .

In step SP131, the credit card company's server 60A receives the credit card contract request from the gateway server 32.

In step SP133, the credit card company's server 60A sends entry screen data for prompting the user to enter information (e.g. his/hername, age, date of birth, address, phone number, employment, annual income, password, etc.) that are needed for the credit card contract with the company A, out to the Internet 70 addressed to the mobile station 100.

In step SP135, the gateway server 32 receives the entry screen data from the credit card company's server 60A and send it to the mobile station 100.

In step SP 137, the mobile station 100 receives the entry screen data from the gateway server 32 and displays an entry screen on its liquid crystal display 132.

FIG. 13E is a diagram of the screen displayed on the mobile station 100 at this time.

In step SP139, the user enters the necessary information while referring to the entry screen displayed on the liquid crystal display 132. The entry screen is shown in FIG. 13E. The user has to enter various items such as his/her phone number and employment in addition to those shown in the figure such as his/her name, date of birth, and address; the user scrolls down the screen, thereby enabling these other items being displayed in sequence on the liquid crystal display 132.

In step SP 141, the mobile station 100 transmits the entered contents (hereinafter referred to as input information), to the gateway server 32. In step SP143, the gateway server 32 receives the input information and transmit them to the credit card company's server 60A. Along with them, in step SP145, the gateway server 32 transmits the input information to the credit card company's server 60A and a notification of credit card contract application receive completion to the mobile station 100.

Then in step SP147, the mobile station 100 receives the receive completion notification from the gateway server 32 and display it on the liquid crystal display 132, thereby notifying the user. FIG. 13F is a diagram of the receive completion notification screen displayed on the mobile station 100 at this time.

On the other hand, in step SP149, the credit card company's server 60A receives the input information from the gateway server 32. In step SP151, the credit card company's server 60A determines whether to approve or deny the credit card contract with regard to the received input information by referring to the examination criteria stored within itself.

In step SP153, if the contract is denied as a result of the examination by the server 60A, the company A's server 60A proceeds to step SP155 and sends out to the Internet 70 a contract denial notification addressed to the mobile station 100.

If the contact is approved as a result of the determination in step SP153, the procedure of the company A's server 60A advances to step SP157 for generating new credit card contract information and sends out to the Internet 70 a contract approval notification and the generated credit card contract information addressed to the mobile station 100.

Then, in step SP159, the credit card company's server 60A stores in the member database 61A user profiles and credit card contract information with regard to this contract.

In step SP161, the gateway server 32 receives the contract denial notification or the contract approval notification and credit card contract information from the credit card company's server 60A, and once stores those information inside.

In step SP163, the gateway server 32 pages the mobile station 100 and transmits a notification indicating that it has received information addressed to the mobile station 100 from the credit card company's server 60A.

Figure 13G:
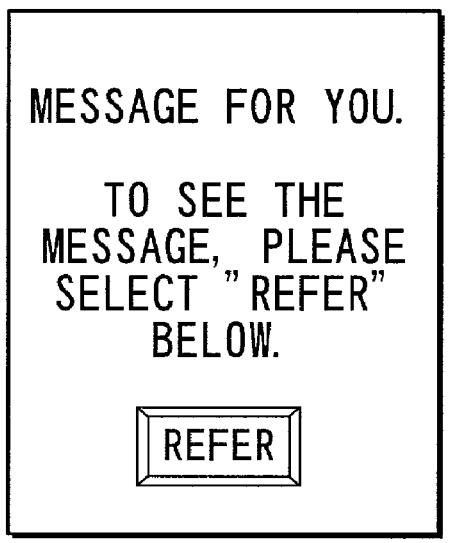

In step SP165, the mobile station 100 receives an information receive notification from the gateway server 32 and displays it on the liquid crystal display 132, thereby notifying the user. FIG. 13G is a diagram of the screen displayed on the mobile station 100 at this time.

Then, in step SP167, by a key operation by the user who has seen the display, the mobile station 100 transmits to the gateway server 32 an information acquiring request to request the acquiring of the information stored therein. In other words, the user selects "refer to" on the display shown in FIG. 13G, by which the information acquiring request is transmitted from the mobile station 100 to the gateway server 32.

In step SP169, the gateway server 32 receives the information acquiring request from the mobile station 100, and in response thereto, transmits to the mobile station 100 the contract denial notification, or the contract approval notification and the credit card contract information.

In step SP171, the mobile station 100, receives the contract denial notification, or the contract approval notification and the credit card contract information from the gateway server 32.

In step SP173, the mobile station 100 displays the received contents on its liquid crystal display 132. The mobile station 100, when it has received the credit card contract approval notification and the credit card contract information, stores the received credit card contract information in the credit card contract ROM 123.

Figure 13H:

FIG. 13H is a diagram of the screen showing the notification of credit card contract denial.

Figure 13I:
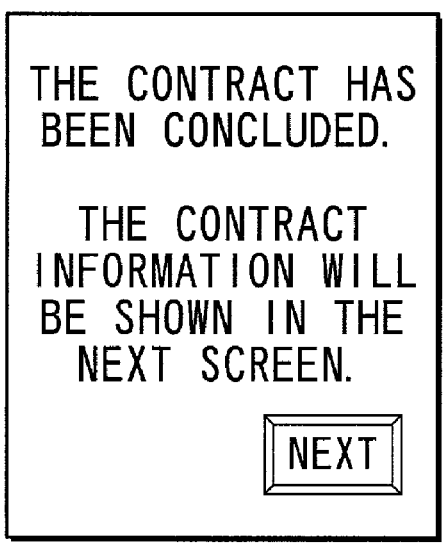
Figure 13J:
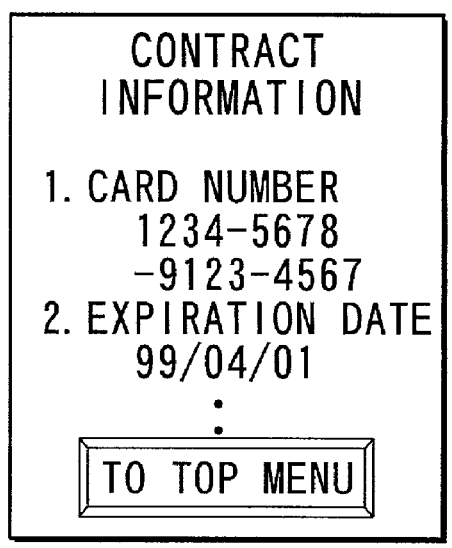

FIG. 13I, on the other hand, is a diagram of the screen showing the notification of credit card contract approval. The user selects "next" on this screen, which in turn changes to the next screen (FIG. 13I). FIG. 13J is a screen for confirming the contents of the credit card contract.

As shown in FIG. 13J, on this screen, such information are displayed as "credit number" and "expiration date."

The screen information shown in FIG. 13J are stored in the credit card contract ROM 123, which can be displayed on the liquid crystal display 132 by a specific operation by the user, thereby enabling the user to confirm the contents of the credit card contract.

As described so far, the mobile station 100 owned by a user and the credit card company's server 60A, 60B, . . . owned by a credit card company conducts the processing for a credit card contract by wireless communication means, thereby enabling the quick execution of the processing; specifically, the application for a credit card contract from a user to a credit card company; the notification of approval or denial of the credit; and the provision of credit card contract information from the credit card company to the user.

Figure 11A:
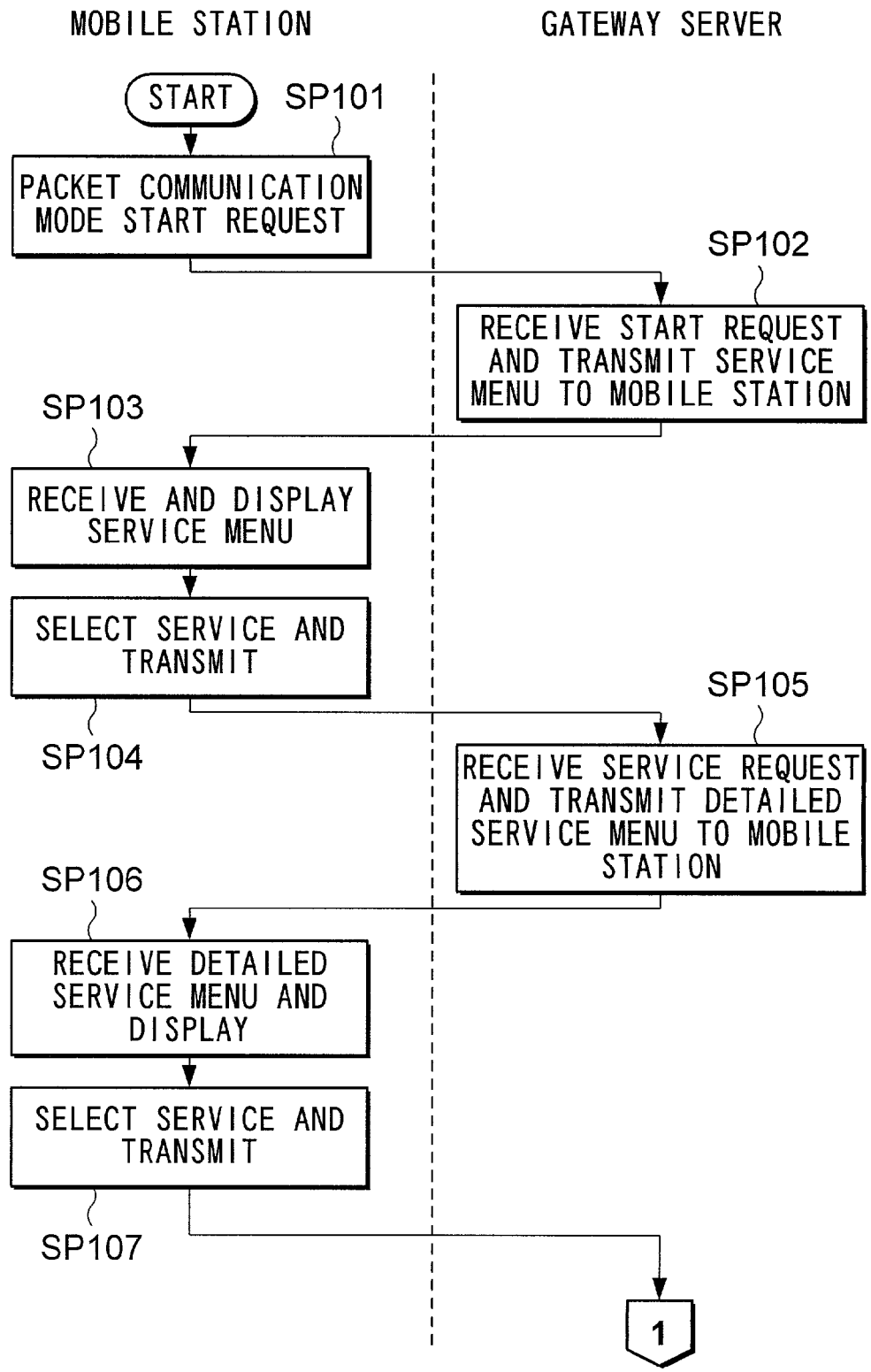
FIG. 11A and FIG. 11B cooperate to form a flow diagram of the first half sequence of operations for signing up credit card contracts, shopping with a credit card via a mobile packet communication network, making changes in registered member information, canceling credit card contracts, and inquiring for credit histories.
Figure 11B:
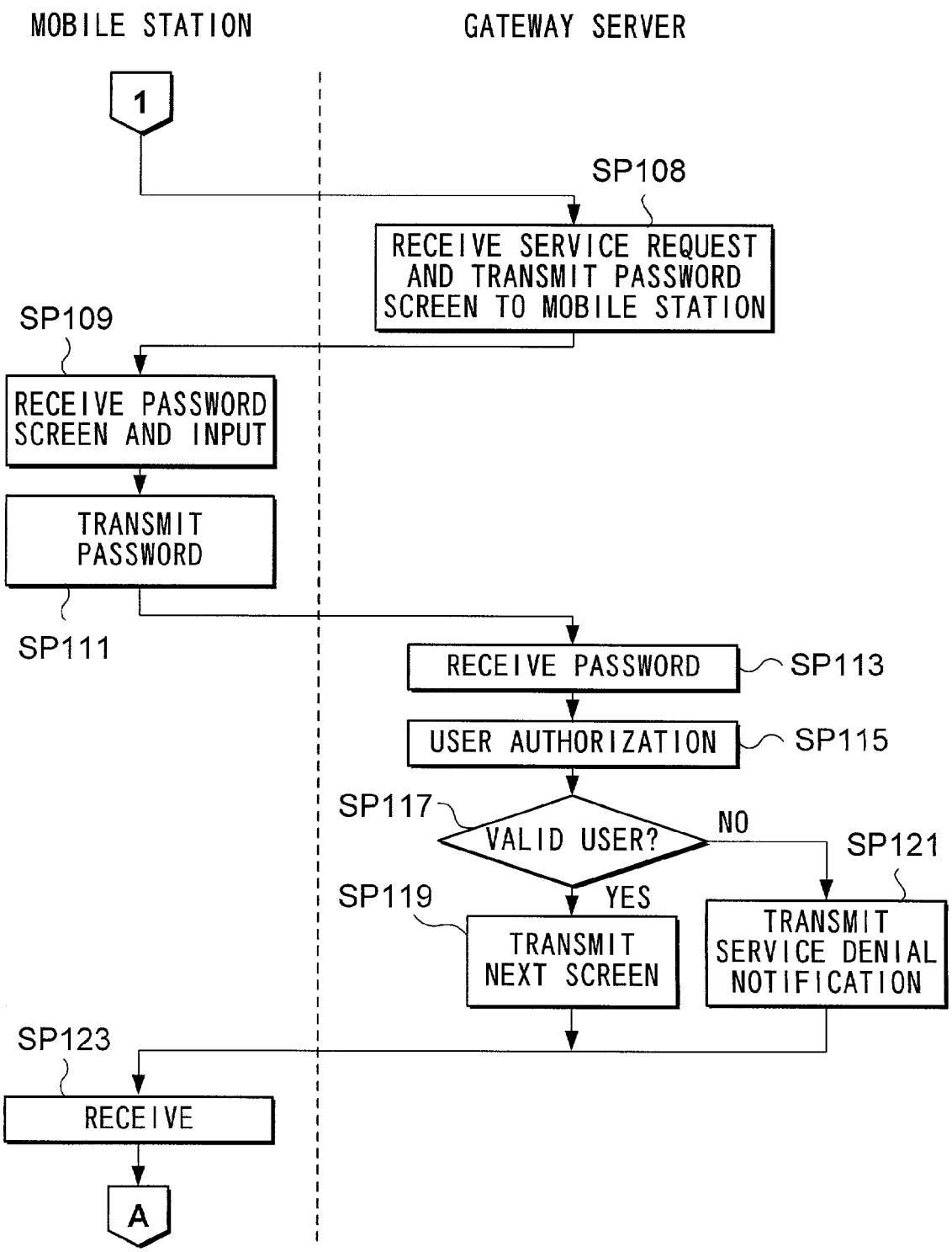

The above-mentioned operation shown in step SP101 to step SP123 in FIG. 11A and FIG. 11B is the operation mainly from the packet communication request to the user authentication, which is performed in common in the first half sequence of each of the operations in using the credit over the mobile communication network, making changes in registered member information, canceling a credit card contract, and inquiring a credit history, as well as the above-mentioned operation of signing up a credit card contract.

[2-2. Operation in Shopping with Credit Card]

Next, an operation in shopping with credit card using a mobile station 100 will be described.

There are two embodiments in the credit card shopping with the mobile station 100.

They are a) an embodiment wherein credit card contract information on the magnetic stripe 160 are given to the credit card company's server 60 through a CAT 40 at the shop; and b) the other embodiment wherein credit card contract information stored in the credit card contract ROM 123 are given to the credit card company's server 60 through the mobile packet communication network 30, which will be described separately hereinafter.

[2-2-a. Operation in Over-the-Counter Shopping with Credit Card]

Figure 14B:
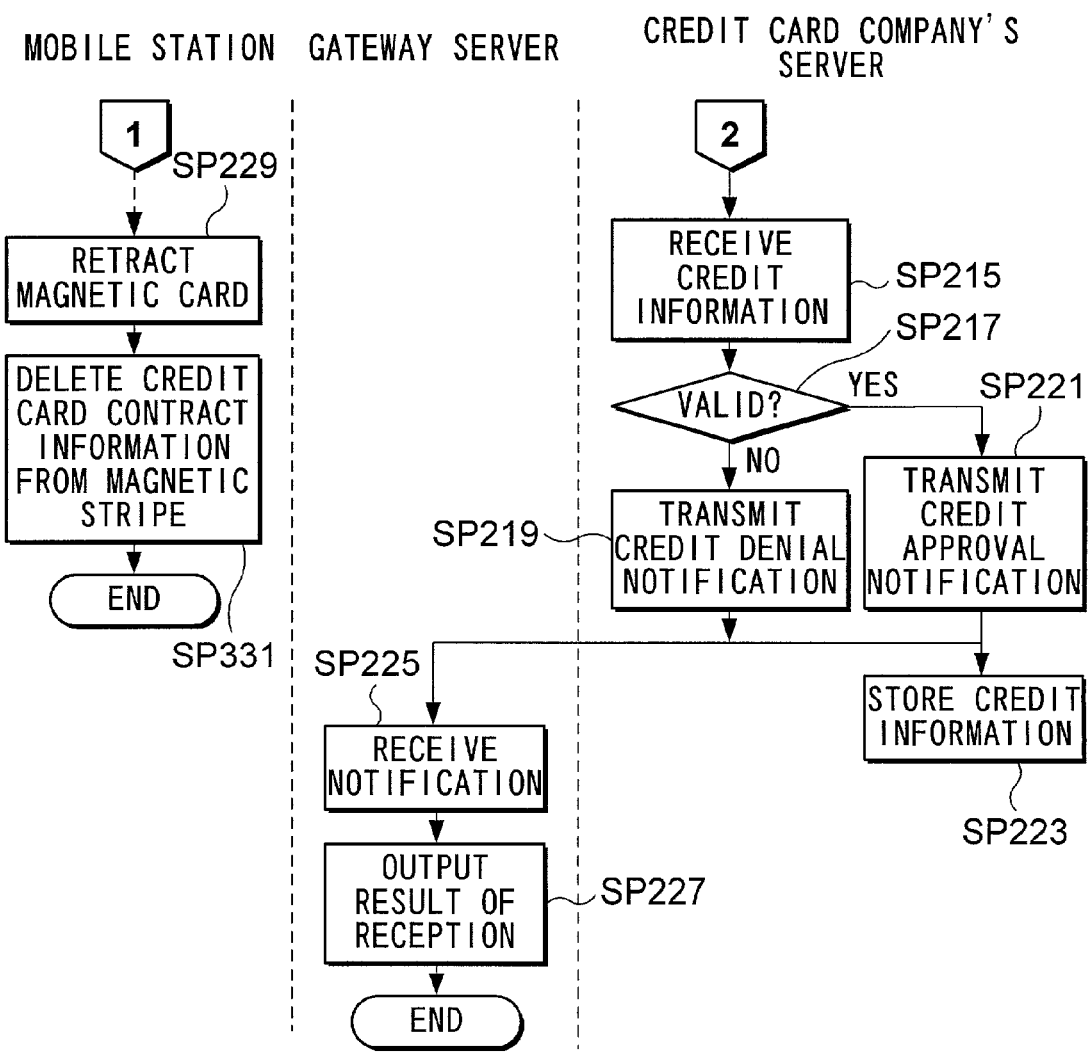

FIG. 14A and FIG. 14B cooperate to form a flow diagram showing the operation of the mobile station 100 and the credit transaction system in the embodiment of using the magnetic stripe 160 at the shop.

First, by a predetermined operation by a user, the processing of the over-the-counter credit shopping begins at the mobile station 100.

In step SP201, the control unit 120 of the mobile station 100 reads out all the credit card contract information stored in the credit card contract ROM 123 to display their company names on the liquid crystal display 132.

In step SP203, the user selects a desired credit card company by a key operation from among the displayed credit card companies. It is assumed herein that the credit card contract with credit card company A has been selected.

On the other hand, if the number of contracted credit card companies is just one, the user may enter "OK" on the displayed credit card company.

In step SP205, the control unit 120 of the mobile station 100 gives the credit card contract information of the selected company A to the magnetic writer 150, which in turn writes the given information onto the magnetic stripe 160.

After the credit card contract information are written on the magnetic stripe 160, the magnetic card 161 becomes a protrudable state, and the control unit 120 displays the fact of being protrudable on the liquid crystal display 132. Then in step SP207, the user, having confirmed the protrudable state, pushes the card-retracting/protruding key of the mobile station 100, thereby protruding the magnetic stripe 160 portion of the magnetic card 161 out of the mobile station 100.

In step SP209, a salesperson slides the magnetic stripe 160 portion of the magnetic card 161 through a magnetic reader of a CAT (assumed herein as a CAT 40b), which in turn the credit card contract information on the magnetic stripe 160 is read into the CAT 40b.

In step SP211, the salesperson enters sales amount for the credit card shopping into an input interface (not shown) of the CAT 40b.

In step SP213, the CAT 40b, through the CAFIS network 50, transmits to the company A's server 60A credit information including the credit card contract information as well as the entered contents into the CAT 40b.

In step SP215, the credit card company's server 60A receives the credit information from the CAT 40b.

In step SP217, the credit card company's server 60A searches in the member database 61A based on the received credit information, and determines whether or not the requested shopping with the credit card is valid. This determination is to see if the credit card is not expired, if the credit limit is not over, if the magnetic stripe on the backside is not disabled, or if the credit card contract itself has no effect.

When it is determined as invalid as a result of the determination in step SP217, the processing by the company A's server 60A advances to step SP219 and transmits to the CAT 40b through the CAFIS network 50 a notification that the requested credit transaction has been denied (and a reason for the credit denial, if necessary).

On the other hand, when it is determined as valid as a result of the determination in step SP217, the processing by the company A's server 60A advances to step SP221, transmits to the CAT 40b a notification that the requested credit transaction has been approved; further in step SP223, stores the credit record and payment information with regard to this credit card shopping transaction within the credit database 62A.

In step SP225, the CAT 40b receives the above notification from the credit card company's server 60A.

Then in step SP227, the CAT 40b outputs the received notification onto a credit sales slip or a CAT display device (not shown). The salesperson performs a predetermined procedure following the displayed contents. After that, the user writes a signature identical to that on the backside of the magnetic card 161 in the signature section of the credit sales slip with the sales amount written, thereby ending the credit card shopping transaction.

At the time of completing the reading of the credit card contract information on the magnetic stripe 160, the user pushes the card retracting/protruding key of the mobile station 100, and in step SP229, the magnetic card 161 is retracted inside the slot 101 of the mobile station 100.

After the magnetic card is retracted, in step SP231, the control unit 120 of the mobile station 100 orders the magnetic writer 150 to delete the credit card contract information of the company A stored on the magnetic stripe 160, and the magnetic writer 150 executes that.

[2-2-b. Operation in Credit Card Shopping with the Mobile Packet Communication Network]

FIG. 11A, FIG. 11B, FIG. 15A, and FIG. 15B cooperate to form a flow diagram showing the operation for shopping with a credit card using the mobile station 100.

The operation shown in FIG. 11A and FIG. 11B is almost same as the sign-up for a credit card contract, but in step SP107 of FIG. 11A, a user should select "credit card shopping" as a desired service. Description for the rest of operation in FIG. 11 shall be omitted.

Figure 15A:
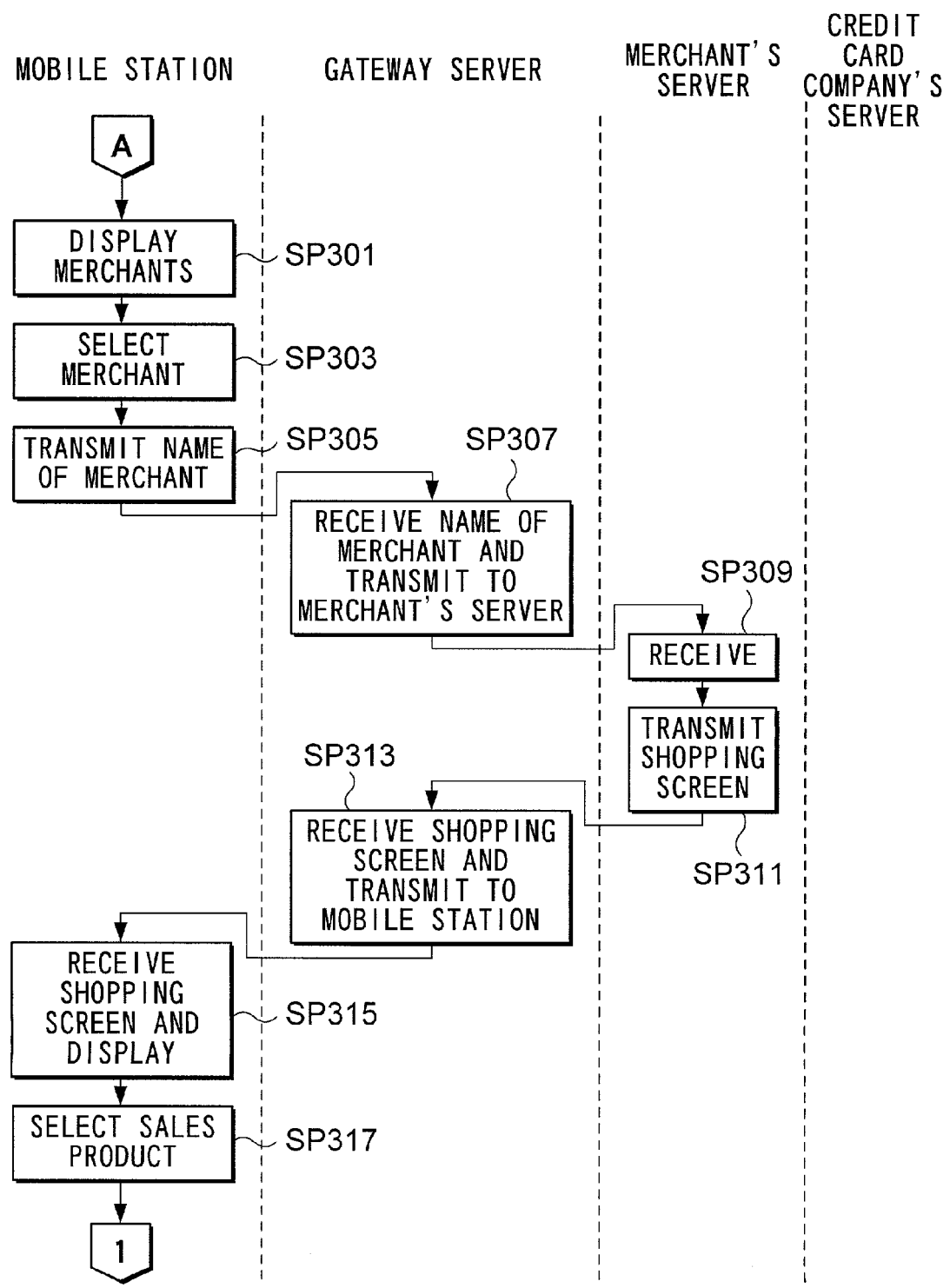
FIG. 15A and FIG. 15B cooperate to form a flow diagram showing an operation of the mobile station 100 and the credit transaction system in shopping with a credit card function of the mobile station 100 via the mobile packet communication network.
Figure 15B:
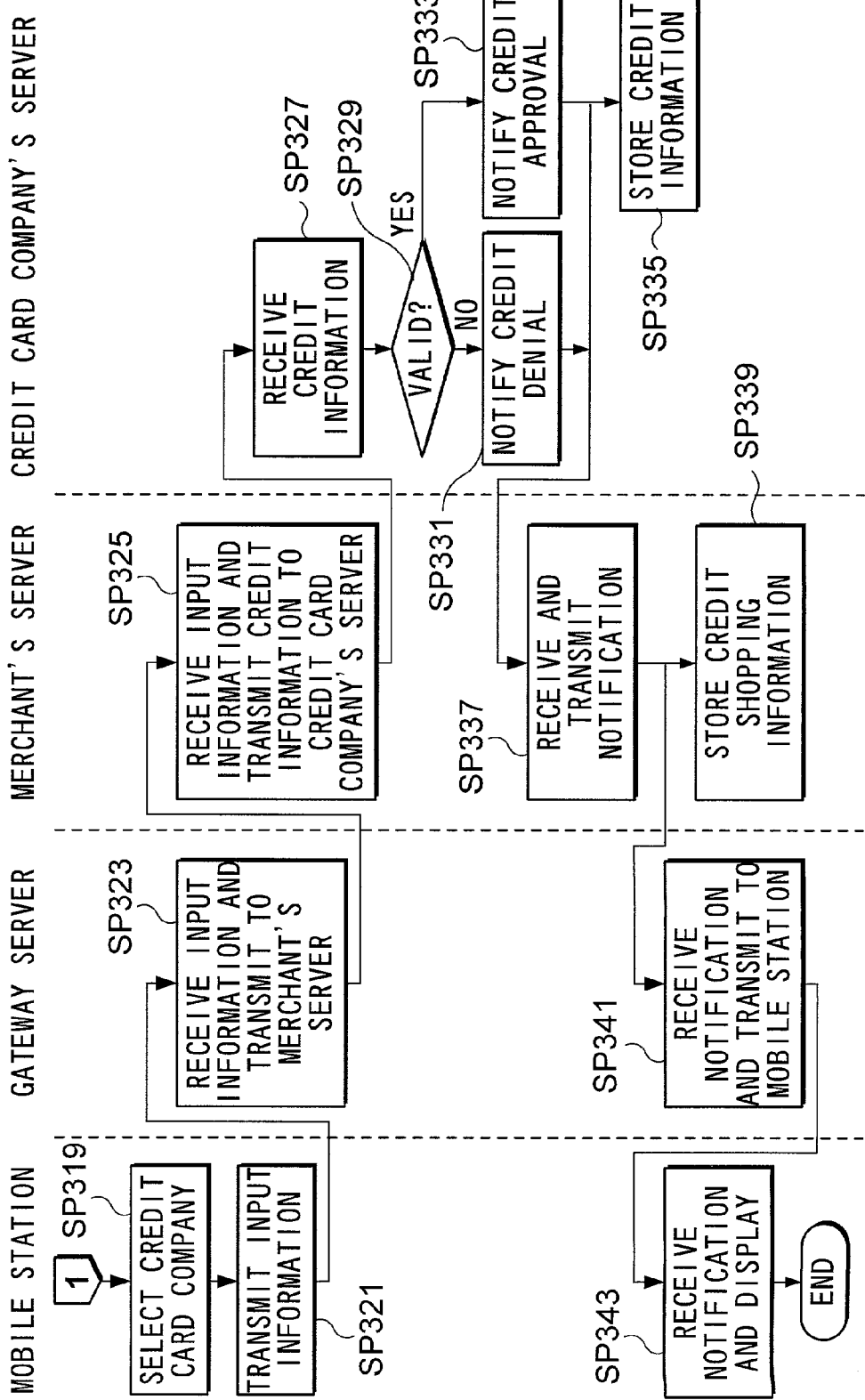

In step SP301 of FIG. 15A, all the merchants where the shopping with credit cards can be made by a user are displayed on the liquid crystal display 132.

In step SP303, a user selects by a key operation a desired merchant from among the displayed merchants. It is assumed herein that the merchant C has been selected.

In step SP305, the mobile station 100 transmits the selected merchant's name (store C) and the URL of the merchant's server 80C to the gateway server 32.

In step SP307, the gateway server 32 receives the merchant's name (store C) and the URL, and based on the received URL, transmits a credit card shopping request to the merchant's server 80C.

In step SP309, the merchant's server 80C receives the credit card shopping request from the gateway server 32.

In step SP311, the merchant's server 80C, in response to the received credit card shopping request, transmits shopping screen data stored in itself out to the Internet 70 addressed to the mobile station 100.

In step SP313, the gateway server 32 receives the shopping screen data from the merchant's server 80C and transmits to the mobile station 100.

In step SP315, the mobile station 100 receives the shopping screen data from the gateway server 32, and a shopping screen is displayed on the liquid crystal display 132.

In step SP317, the user selects a product to purchase referring to the shopping screen displayed on the liquid crystal display 132.

When the selecting of a product is completed, the mobile station 100 reads out all the credit card contract information stored in the credit card contract ROM 123, and the names of credit companies thereof are displayed on the liquid crystal display 132. Then in step SP319, from among the displayed credit card companies, the user selects a credit card company to be used in this credit card shopping. It is assumed herein that the credit card company B has been selected.

In step SP321, the mobile station 100 transmits information on the selected product and its price, credit card contract information with the company B, the URL of the merchant's server 80C, and the URL of the credit company's server 60B to the gateway server 32.

In step SP323, the gateway server 32 receives these information from the mobile station 100 and, after seeing its contents, transmits the information to the merchant's server 80C.

In step SP325, the merchant's server 80C receives the input information from the gateway server 32. Then, the merchant's server 80C, among the received information, transmits the credit card contract information and sales amount information to the credit company's server 60B.

In step SP327, the credit company's server 60B receives these credit information from the merchant's server 80C. In step SP329, the credit company's server 60B retrieves the received credit information in the member database 61B and determines whether the requested credit card shopping is valid or not.

This determination is to check items such as if the credit card contract is not expired; if the credit limit is not exceeded; if the magnetic card is not disabled; or if the credit card contract itself has no effect.

As a result of the determination in step SP329, when it is determined as invalid, the routine advances to step SP331, and the credit company's server 60B transmits a notification indicating the denial of the requested credit card shopping to the merchant's server 80C.

On the other hand, as a result of the determination in step SP329, when it is determined as valid, the process of the credit card company's server 60B advances to step SP333, transmits a credit approval notification to the merchant's server 80C, and further stores the credit history and payment information in the credit database 62B in step SP335.

In step SP337, the merchant's server 80C receives the notification from the credit card company's server 60B. Then in step SP339, the merchant's server 80C transmits the received notification to the gateway server 32 addressed to the mobile station 100. If the notification is a credit approval notification, the merchant's server 80C stores the product selected by the user as credit card sales information and performs a predetermined processing such as sending the product to the user.

In step SP341, the gateway server 32 receives the notification from the merchant's server 80C and transmits to the mobile station 100.

In step SP343, the mobile station 100 receives the notification from the gateway server 32 and displays the received contents on the liquid crystal display 132, thereby notifying the user.

[2-3. Operation in Renewing the Credit Card Contract]

Next, the operation in renewing a credit card contract will be described.

FIG. 16A and FIG. 16B cooperate to form a flow diagram showing the operational flow in renewing a credit card contract.

In step SP401, the credit card company's server (herein assumed as 60A) creates the prospective contract-renewal members file 601 referring to the member database 60A. In step SP403, the credit card company's server 60A transmits, referring to the prospective contract-renewal members file 601, a contract renewal advance notification to notify the renewal of the credit card contract in advance, out to the Internet 70, addressed to a mobile station (herein assumed as the mobile station 100) of the user with prospective contract renewal.

In step SP405, the gateway server 32, upon receiving the contract renewal advance notification, pages the mobile station 100 to redirect the above notification.

In step SP407, the mobile station 100 receives the contract renewal advance notification from the gateway server 32 and displays the received notification on its liquid crystal display 132.

In step SP409, the mobile station 100, by a key operation by the user, transmits response information in response to the displayed contract renewal advance notification. The response information designates either "will renew" or "will not renew" with regard to the contract renewal.

In step SP411, the gateway server 32 receives the response information from the mobile station 100 and transmits to the credit card company's server 60A.

In step SP413, the credit card company's server 60A receives the response information from the gateway server 32.

In step SP415, the credit card company's server 60A, based on the received response information, determines whether or not the credit card contract with the user of the mobile station 100 can be renewed.

As a result of the determination in step SP415, if the contract is renewable, the routine advances to step SP417, and the credit company's server 60A generates renewed credit card contract information, the new credit card contract information being sent out to the Internet 70 addressed to the mobile station 100 as well as being stored in the member database 60A.

As a result of the determination of step SP415, if the contract is not renewable, the routine advances to step SP421, and the credit card company's server 60A deletes information on the user whose contract cannot be extended, the information being stored in the member database 61A. Then in step SP423, the credit card company's server 60A sends a notification designating that the contract cannot be renewed, out to the Internet 70, addressed to the mobile station 100.

Then in step SP425, the gateway server 32 receives from the credit card company's server 60A the renewed credit card contract information or the contract non-renewal notification and stores them for the time being.

Then in step SP427, the gateway server 32 pages the mobile station 100 and transmits a notification designating that information addressed to the mobile station 100 from the credit card company's server 60A have been received.

In step SP429, the mobile station 100 receives the information receive notification data from the gateway server 32 and displays them on its liquid crystal display 132, thereby notifying the user.

In step SP431, by a key operation by the user who has seen the display, the mobile station 100 transmits to the gateway server 32 a request for requesting to obtain the information stored therein.

In step SP433, the gateway server 32 receives the information obtaining request from the mobile station 100, in response to which, the gateway server 32 transmits the after-renewed credit card contract information or the contract non-renewal notification stored therein to the mobile station 100.

In step SP435, the mobile station 100 receives the renewed credit card contract information or the no-contract-renewal notification data from the gateway server 32 and displays them on its liquid crystal display 132.

In step SP437, the mobile station 100, when it has received the renewed credit card contract information, updates information such as an expiration date. Alternatively, when it has received the effect of no-contract-renewal, the credit card contract information stored in the credit card contract ROM 123 is deleted after the expiration of a term of validity.

If the user does not respond to the credit card contract advance notification given to the mobile station 100 even after the expiration date, it is regarded that the user has responded "YES" to the contract renewal; the credit card company server 60A transmits credit card contract information renewed at the time of the expiration to the mobile station 100 via the gateway server, and the mobile station 100 updates information such as an expiration date.

[2-4. Operation in Changing the Registered Member Information]

Also in the case of changing member's name and address, it is possible to make these changes using a mobile station 100. An operation in making changes in a credit card contract will be described hereinafter.

FIG. 11A, FIG. 11B, FIG. 17A, and FIG. 17B cooperate to form a flow diagram showing the operation, using the mobile station 100, in a credit card contract.

The operation shown in FIG. 11A and FIG. 11B is almost same as the sign-up of a credit card contract, but in step SP107 of FIG. 11A, a user should select "change in registered member information" as a desired service. Description for the rest of the operation will be omitted.

In step SP501 of FIG. 17A, all the credit card companies with which the user is under contract are displayed on the liquid crystal display 132.

In step SP503, the user selects by a key operation a desired credit card company from among the displayed credit card companies. Here, it is also possible to select all the credit card companies. It is assumed here that the credit card company A has been selected.

In step SP505, the mobile station 100 transmits the name of the selected credit card company to the gateway server 32.

In step SP509, the gateway server 32 receives the name of the credit card company from the mobile station 100 and transmits a request for making changes in the registered member information toward the credit card company's server 60A.

In step SP511, the credit card company's server 60A receives the request for making changes in the registered member information.

In step SP513, the credit card company's server 60A sends change screen information of the credit card contract of the company A out to the Internet 70 addressed to the mobile station 100.

In step SP515, the gateway server 32 receives the change screen information from the credit card company's server 60A via the Internet and transmits the received screen information addressed to the mobile station 100.

In step SP517, the mobile station 100 receives the change screen information from the gateway server 32 and displays a change screen on the liquid crystal display 132.

In step SP519, the user enters items to change referring to the change screen displayed on the liquid crystal display 132.

In step SP521, the mobile station 100 transmits the entered change items to the gateway server 32.

In step SP523, the gateway server 32 receives the changed items and transmit them to the credit card company's server 60A.

In step SP525, the credit card company's server 60A receives the changed items.

In step SP527, the credit card company's server 60A changes user profiles and attributes associated with the credit card contract stored in itself, based on the received changed items.

Once the changing processing is complete, the credit card company's server 60A advances to step SP529 and sends a notification to designate the completion of change-in-contract processing out to the Internet 70 addressed to the mobile station 100.

In step SP531, the gateway server 32 receives via the Internet 70 the notification of completion to be transmitted to the mobile station 100.

In step SP533, the mobile station 100 receives the notification of completion from the gateway server 32, and in step SP535, the mobile station 100 displays the received notification of completion on its liquid crystal display 132.

[2-5. Operation in Canceling a Credit Card Contract]

It is possible to use this system also in the processing for canceling a credit card contract. An operation in a credit card contract using a mobile station 100 will be described hereinafter.

FIG. 11A, FIG. 11B, and FIG. 18 cooperate to form a flow diagram showing the operation of the case where a user cancels a credit card contract using the mobile station 100.

The operation shown in FIG. 11A and FIG. 11B is almost same as the sign-up for a credit card contract, but in step SP107 of FIG. 11A, a user should select "cancel a credit card contract" as a desired service. Description for the rest of the operation shall be omitted.

In step SP601 in FIG. 18, all the credit companies with which the user is under contract are displayed on the liquid crystal display 132.

In step SP603, the user selects, from among the displayed credit card companies, a desired credit card company by a key operation. It is assumed here that the credit card company A has been selected.

In step SP605, the mobile station 100 transmits the name of the selected credit card company to the gateway server 32.

In step SP607, the gateway server 32 receives the name of credit card company from the mobile station 100 and transmits to the credit card company's server 60A a request for canceling the credit card contract.

In step SP609, the credit card company's server 60A receives the credit card contract canceling request from the gateway server 32.

In step SP611, the credit card company's server 60A, based on the received credit card contract canceling request, performs the canceling processing of the credit card contract such as deleting the user profile information and credit card contract attributes information stored in the member database 61A.

In step SP613, the credit card company's server 60A sends out to the Internet 70 a notification that tells that the contract cancellation processing has been completed, addressed to the mobile station 100.

In step SP615, the gateway server 32 receives the notification of completion through the Internet 70, and sends it to the mobile station 100.

In step SP617, the mobile station 100 receives the notification of completion from the gateway server 32.

In step SP619, the mobile station 100 displays the received notification of completion on its liquid crystal display 132.

[2-6. Operation in Disabling the Communication and Credit Card Function of Mobile Station 100]

In cases where a user has lost a mobile station 100 or had it stolen, it is necessary to disable the credit function in order to prevent a third person from illegal use of the mobile station 100. An operation of the mobile station 100 and the control unit in disabling the credit function of the mobile station 100 will be described hereinafter.

FIG. 19 is a flow chart showing the flow of the process by the mobile station 100 and the control unit of disabling the credit card function of the mobile station 100.

A user who owns the mobile station 100, in the case of losing the mobile station 100, makes a contact with a common carrier who manages the mobile telephone network 20 and the mobile packet communication network 30 by a predetermined method, and requests to disable the calling and credit card function of the mobile station 100.

In step SP701, the communication carrier who has received the above report, by using a specified administrative terminal, makes an access to a memory that stores disabling information corresponding to the subject mobile communication terminal, the subscriber database 331 of the control unit 33 in the present embodiment, and registers a flag that designates the disablement of communication service for the user and his credit card.

After this operation, the communication service by the mobile station 100 of the subject user and its credit card function become disabled. In the concrete, the operation will be described hereinafter.

First in step SP703, a third person who has illegally gained the mobile station 100 turns on the mobile station 100.

In step SP705, the mobile station 100 uses a particular channel and transmits dispatch information including a notification that tells that the power is on and identification number that are identification information for identifying the mobile station 100. The base station that includes the mobile station 100 in its control area (herein assumed as the base station 32) receives the dispatch information concerning the location of the mobile station 100, the dispatch information being sent to the control unit 33.

In step SP707, the control unit 33 receives the dispatch information from the base station 32. Then in step SP709, the control unit 33 makes an access to the subscriber database 331 and determines presence or absence of the disabling information of the calling and credit card functions of the sender, the mobile station 100.

In step SP711, the control unit 33, which has determined that the disabling information is present, transmits through the base station 32 to the mobile station 100 disabling signals for suspending the calling and credit card functions of the mobile station 100 are to be disabled.

In step SP713, the mobile station 100 receives an instruction of disabling the calling and credit card functions through the base station 31.

In step SP715, the mobile station 100 performs the process for disabling the calling and credit card functions.

In the process for disabling the calling, the operation of each section which operates for the calling process of the mobile station 100 will be stopped, and the wireless communication function of the mobile station 100 will be suspended. In the process for disabling the credit card function, the credit card contract information stored in the credit card contract ROM 123 will be deleted, thereby inhibiting the use of card information.

[2-7. Operation in Inquiring the Credit History]

Using a mobile station 100, a user can make an access to the credit card company's server 60A, 60B, . . . to inquire various types of information such as credit history and the amount of next payment charged to the user's bank account.

FIG. 11A, FIG. 11B, and FIG. 20 cooperate to form a flow diagram showing an operation when a user inquires a credit history by using the mobile station 100.

The operation shown in FIG. 11A and FIG. 11B is almost same as the sign-up for a credit card contract, but in step SP107 of FIG. 11A, a user should select "credit history" as a desired service. Description for the rest of the operation shall be omitted.

In step SP801 of FIG. 20, all the credit card companies with which the user is under contract are shown on the liquid crystal display 132.

In step SP803, the user selects by a key operation a desired credit card company from among the displayed credit card companies. It is assumed here that the credit card company A has been selected.

In step SP805, the mobile station 100 transmits the name of the selected credit card company (company A) to the gateway server 32.

In step SP807, the gateway server 32 receives the name of the selected credit card (company A) from the mobile station 100 and transmits a request for inquiring the credit history to the credit card company's server 60A.

In step SP809, the credit card company's server 60A receives the request for inquiring the credit history. In step SP811, the credit card company's server 60A retrieves credit history information stored in the credit database 62A.

In step SP813, the credit card company's server 60A transmits the credit history information obtained as a result of the retrieval out to the Internet 70 addressed to the mobile station 100.

In step SP815, the gateway server 32 receives the credit history information via the Internet 70 and transmits the information to the mobile station 100.

In step SP817, the mobile station 100 receives the credit history information from the gateway server 32. In step SP819, the mobile station 100 displays the received credit history on its liquid crystal display 132.

[B. Modifications]

[B-1. Modifications in Signing Up for a Credit Card Contract]

In the above-mentioned description, all steps of the operation in signing up for a credit card contract are performed in one calling session, but it is not necessarily in this way. In other words, the operation of requesting a credit card contract from the mobile station 100 to the credit card company's server 60 (i.e. from step SP101 in FIG. 11A to step SP149 in FIG. 12B) and the operation of responding from the credit card company's server 60 to the mobile station 100 (i.e. from step SP151 to step SP173 in FIG. 12B) can be separated.

To illustrate, cases can be envisioned such that it takes a considerable amount of time in the examination process of credit card contracts and that a partial or whole examination process being performed by other information processing devices or a human agent, in which cases, it is possible to once end the communication between the mobile station 100 and the credit card companies' server 60, so that the credit card companies' server 60 may notify the result of the examination to the mobile station 100 at a later date.

Further, the processing at the credit card companies' server 60A, 60B, . . . in making a credit card contract may only be the processing associated with the operation of requesting a credit card contract.

Figure 12B:
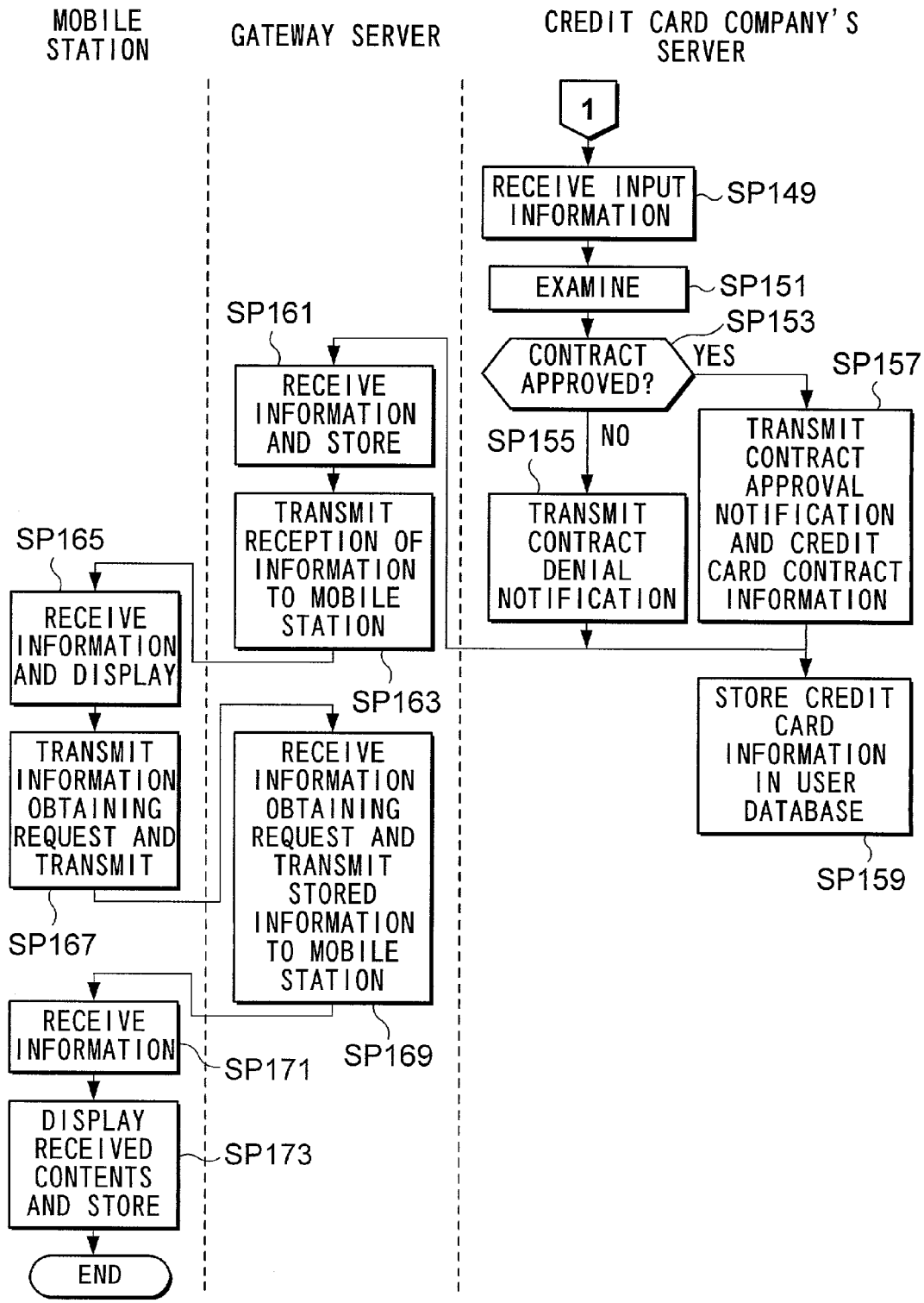

For example, the procedure may end in the step SP149 of FIG. 12B, which is followed, in the case of the request for contract being denied, by a notification to that effect over a telephone to the user. Alternatively, in the case of the request being approved, a user is notified to that effect over a telephone, so that he/she goes to the shop of the credit card company to get one's credit card contract information written in the mobile station 100 through an exclusive ROM reader/writer provided therein.

[B-2. Modifications in Changing Registered Member Profiles]

Various changes for registered member profiles can be conceived such as credit limit and card class, i.e. the change from a normal-class credit card to a gold-class card, in addition to the above-mentioned changes in name and address. In such cases, in addition to the above-mentioned group of steps of the operation, it will be necessary to take a step of examination by a credit card company and a step of notification to the mobile station 100 from the credit card company's server 60 of an approved change or a refused change.

[B-3. Modifications in Disabling the Mobile Station 100 and Its Credit Card Function]

Various timings can be conceived for the mobile station 100 to transmit the dispatch information, not being limited to the time when power is turned on.

For example, it can be envisioned such as the time when the mobile station 100 requests a calling service or a packet communication service to the mobile communication network; and the time when the process for the credit use of the mobile station 100 is started at the shop. In other words, it may be set so that the mobile station 100 transmits the information, triggered by some kind of operation by a person who has the mobile station 100. Alternatively, the mobile station 100 may transmit the information at all times or regularly while the power is on.

Further, when the disabling information is registered at the control unit 33, the control unit 33 may page the mobile station 100 relating to the disablement to provide the mobile station 100 with the disabling information. Upon receiving the disabling information, the mobile station 100 transmits a receive confirmation signal, and the control unit 33 receives the receive confirmation signal, thereby confirming that the mobile station 100 has received the disabling information.

Further, the control unit 33, after detecting that there has been some kind of information transmitted from the mobile station 100, may transmit through many base stations 32 the above-mentioned disabling information to each base station's control area at all times or regularly. Then, the mobile station 100 that has received the transmitted disabling information may conduct the disabling of its own credit card function.

It is also possible for the control unit 33 to possess the disabling information only for the calling function of the mobile station 100, to be given to the mobile station 100. Then, the mobile station 100 that has received the disablement-of-calling information may determine its credit card function is also to be disabled, performing the disabling operation of not only its calling but also credit card function.

[B-4. Modifications in the Configurations of the Gateway Server 32, Credit Card Company's Sever 60, and Merchant's Server 80]

The credit company's server 60A, 60B, . . . and the merchant's server 80 may be connected to, aside from the Internet 70, the gateway server 32 through a private line, or may be provided inside the mobile communication network.

[B-5. Modifications in the Roles of the Gateway Server 32, Credit Card Company's Sever 60, and Merchant's Server 80]

The functions of the gateway server 32, the credit company's server 60 and the merchant's server 80, are not limited to the above-mentioned embodiments, but various embodiments can be conceived. For example, a part of functions of the merchant's server 80 and the credit company's server 60 can be carried out by the gateway server 32.

In the first embodiment, the credit card company's server 60A, 60B, . . . stores entry screen information and change screen information used for making a credit card contract or changes, but the gateway server 32 instead can store those screen information. As a result, when a request for contract or changes in contract is transmitted from the mobile station 100 to the gateway server 32, the gateway server 32 does not need to access the credit card company's server 60A, 60B, . . . to provide entry screen information with the mobile station 100.

Further, the gateway server 32, instead of the credit card company's server 60A, 60B, . . . , may conduct an examination for determining approval or denial of credit card contracts. In order to do this, the gateway server 32 stores criteria for determining contract approval or denial that are provided in advance from each of the credit card company's servers 60A, 60B, . . . , so as to conduct examinations based on these criteria.

Further, the gateway server 32 may store the prospective contract-renewal members file 601. In this case, the gateway server 32 is provided prospective contract-renewal members files 601 from the credit card company's servers 60A, 60B, . . . , and based on the given prospective contract-renewal members file 601, further process with the mobile station 100 is carried out.

Also, in the above-mentioned embodiments, the gateway server 32 once stores information from the credit card company's server 60A, 60B, . . . (i.e. credit card contract information and other notifications), and transmits information receive notifications to the mobile station 100. Then, in the case of receiving a request for obtaining credit card contract information from the mobile station 100, the gateway server 32 gives the credit card contract information to the mobile station 100.

However, it is not limited thereto. For example, when the gateway server 32 receives some kind of information addressed to the mobile station 100 from the credit card company's server 60A, 60B, . . . , it is possible to give the information to the mobile station 100 without giving any prior notification to the mobile station 100, or the information together with some kind of notification. In this case, when the mobile station 100 receives the information from the gateway server 32, it transmits a receive confirmation signal, so that the gateway server 32 confirms that the mobile station 100 has received the information by receiving the reception confirmation signal.

Further, in the above-mentioned embodiment for the credit card shopping through the mobile packet communication network 30, all the input information transmitted from the mobile station 100 are received by the merchant's server 80 through the gateway server 32, and the merchant's server 80 transmits credit card contract information and amount-of-transaction information among the input information to the credit card company's server 60, but it is not limited thereto.

For example, the gateway server 32 may classify contents of the input information into a group of information addressed to the merchant server 80 and the other group of information addressed to the credit card company's server 60, and transmit them separately. That is, the gateway server 32 transmits the sales product information among the input information to the merchant's server 80; and transmits the credit card contract information and amount-of-transaction information to the credit card company's server 60. Then, credit-approval or denial information from the credit card company's server 60 may be transmitted to the mobile station 100 through the merchant's server 80, or from the credit card company's server 60 directly to the mobile station 100 and the merchant's server 80.

Further, the gateway server 32 may store shopping screens and, upon receiving a request from the mobile station 100, provide the stored shopping screen with the mobile station 100.

[B-6. Types of Contracts]

In the above embodiments, the contract has been described in terms of the sign-up for credit cards, but it is not limited thereto. Various types of contracts may be envisioned such as opening bank accounts or making loan contracts with financial institutions, making insurance contracts with insurance companies, or acquiring membership with various organizations.

[B-7. Modifications in the Mobile Station 100 and the CAT 40]

[B-7-1. First Modification]

A mobile station 100 may provide credit card contract information with the CAT 40a, 40b, . . . by using bar codes.

Figure 21:
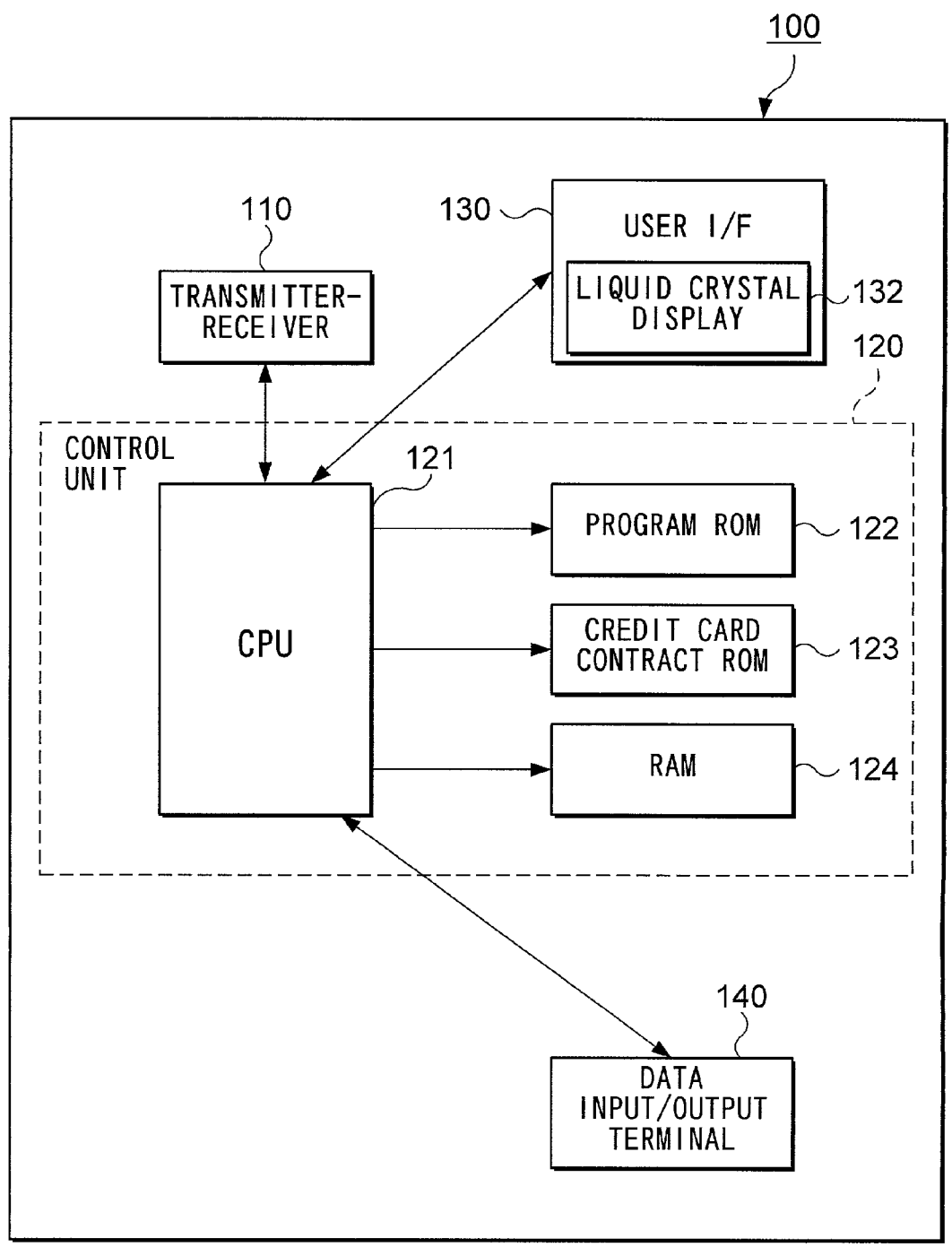
FIG. 21 is a block diagram showing a configuration of a mobile station 100 that displays bar codes indicating credit card contract information on its liquid crystal display 132.

FIG. 21 is a block diagram showing a configuration of a mobile station 100 that displays bar codes indicating credit card contract information on the liquid crystal display 132.

This mobile station 100 comprises a transmitter-receiver 110, a control unit 120, a user interface 130 that has a liquid crystal display 132, and a data input/output terminal 140.

Control programs stored in the program ROM 122 include a program for generating bar code data designating credit card contract information.

When there is a need to display credit card contract information, the CPU 121 reads out credit card contract information from the credit card contract ROM 123, generates bar code data designating the credit card contract information in accordance with the bar code generating program and displays the generated bar code on the liquid crystal display 132.

On the other hand, the CAT 40*a*, 40*b*, . . . is equipped with a bar-code reader and capable of reading the bar code displayed on the liquid crystal display 132 of the mobile station 100.

Figure 22:
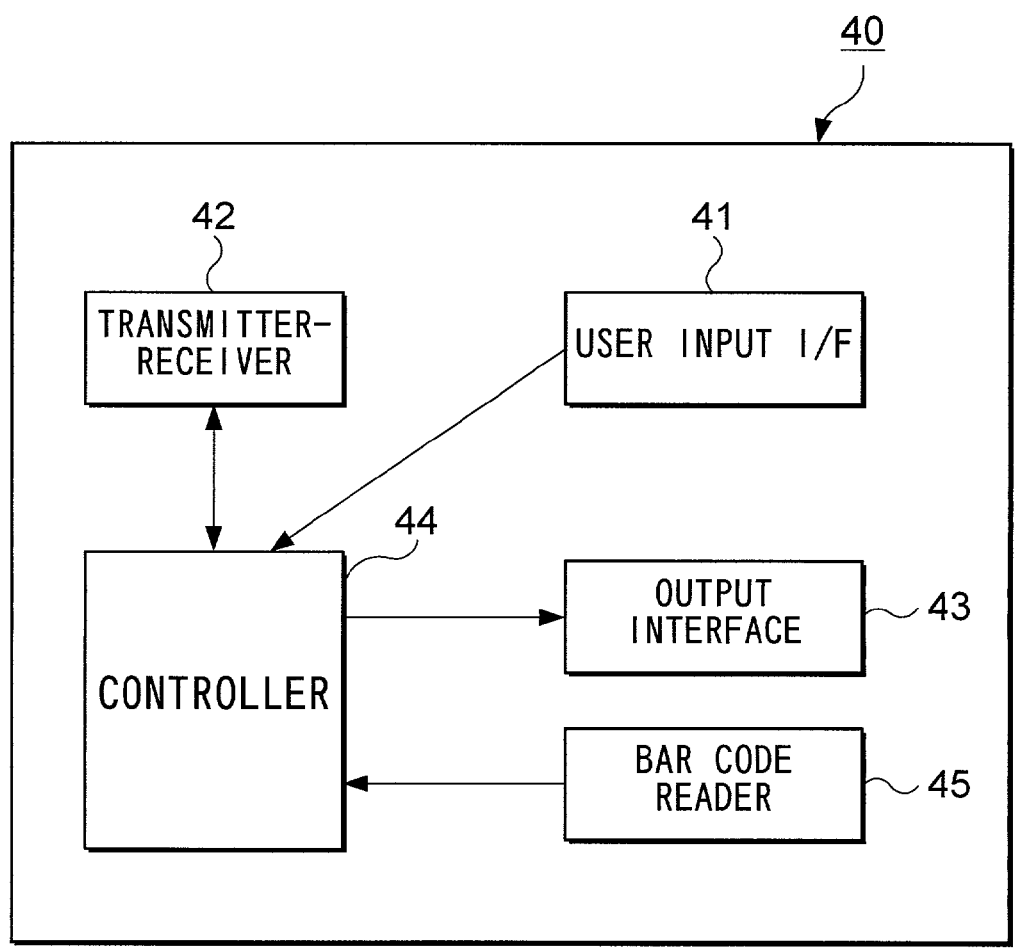
FIG. 22 is a block diagram showing a configuration of CAT 40 equipped with a bar-code reader.

FIG. 22 is a block diagram showing a configuration of a CAT 40 equipped with the bar-code reader.

The CAT 40 comprises, a user interface 41, a transmitter-receiver 42, an output interface 43, a controller 44, and a bar-code reader 45.

The controller 44 controls each section of the CAT 40. The user interface 41 is for a sales person to enter sales amount. The bar-code reader 45 reads the bar code displayed on the liquid crystal display 132 of the mobile station 100. The transmitter-receiver 42 exchanges various information with the CAFIS network 50. The output interface 43 is a printing device of a credit sales slip.

Other configurations and operations are same as the first embodiment.

What to be displayed on the liquid crystal display 132 is not limited to bar codes but may be anything that can be optically read; for example, calra code or veri code.

[B-7-2. Second Modification]

A mobile station 100 may provide credit card contract information with the CAT 40*a*, 40*b*, . . . by using infrared rays.

Figure 23:
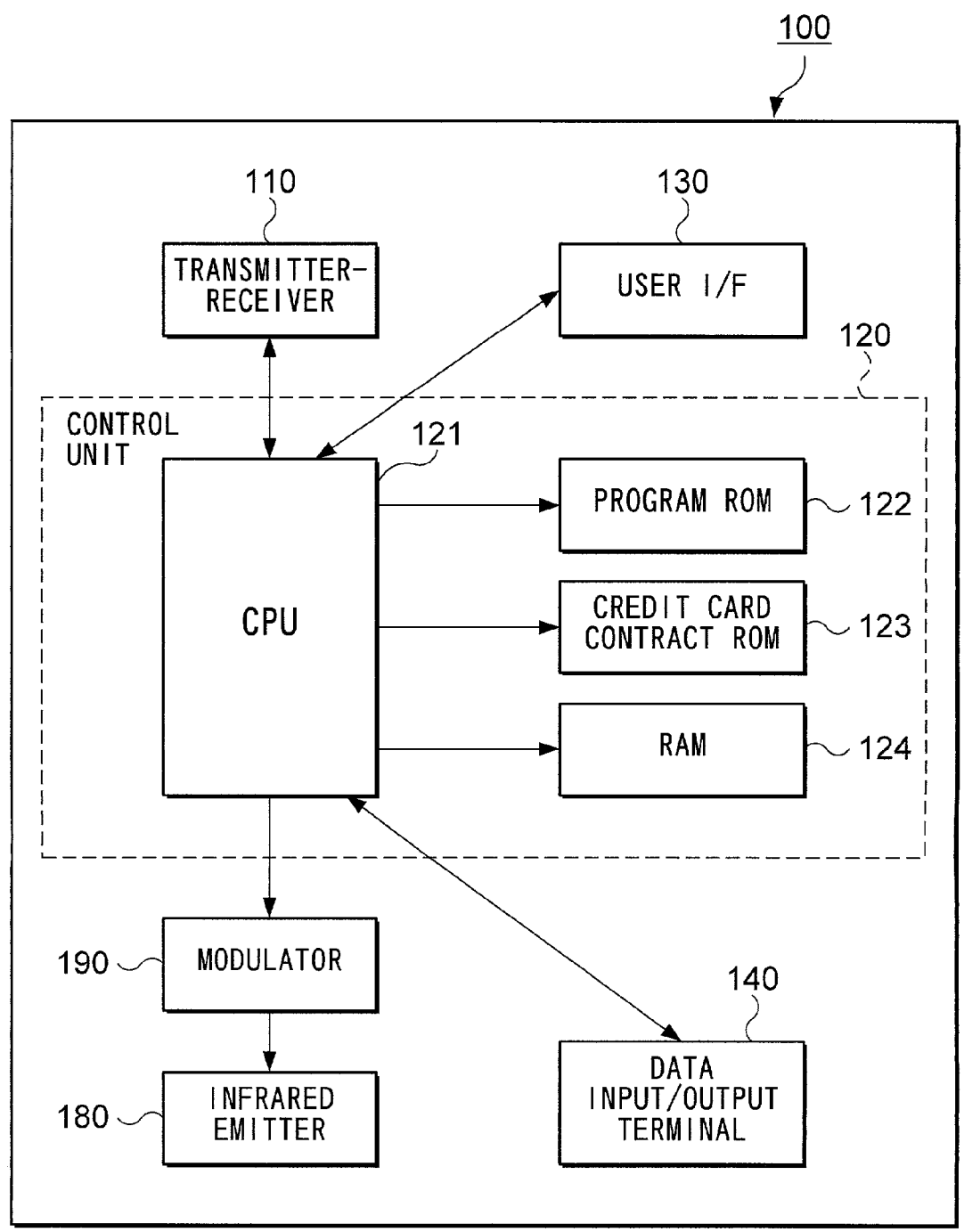
FIG. 23 is a block diagram showing a configuration of the mobile station 100 that transmits credit card contract information to the CAT 40a, 40b, . . . by an infrared communication.

FIG. 23 is a block diagram showing a configuration of the mobile station 100 that provides credit card contract information with the CAT 40*a*, 40*b*, . . . by infrared rays.

This mobile station 100 comprises a transmitter-receiver 110, a control unit 120, a user interface 130, a data input/output terminal 140, a modulator 170, and an infrared emitter 180.

When there is a need to provide credit card contract information to the CAT 40*a*, 40*b*, . . . , the CPU 121 reads out credit card information from the credit card contract ROM 123 and gives them to the modulator 170. The modulator 170 modulates infrared ray carrier by signal waves corresponding to the given credit card contract information and give the modulated infrared rays to the infrared emitter 180. The infrared emitter 180 emits the given infrared rays.

On the other hand, the CAT 40*a*, 40*b*, . . . is equipped with an infrared receiver as well as a demodulator, by which the infrared rays emitted from the infrared emitter 180 of the mobile station 100 are received and demodulated so as to acquire the credit card contract information.

Figure 24:
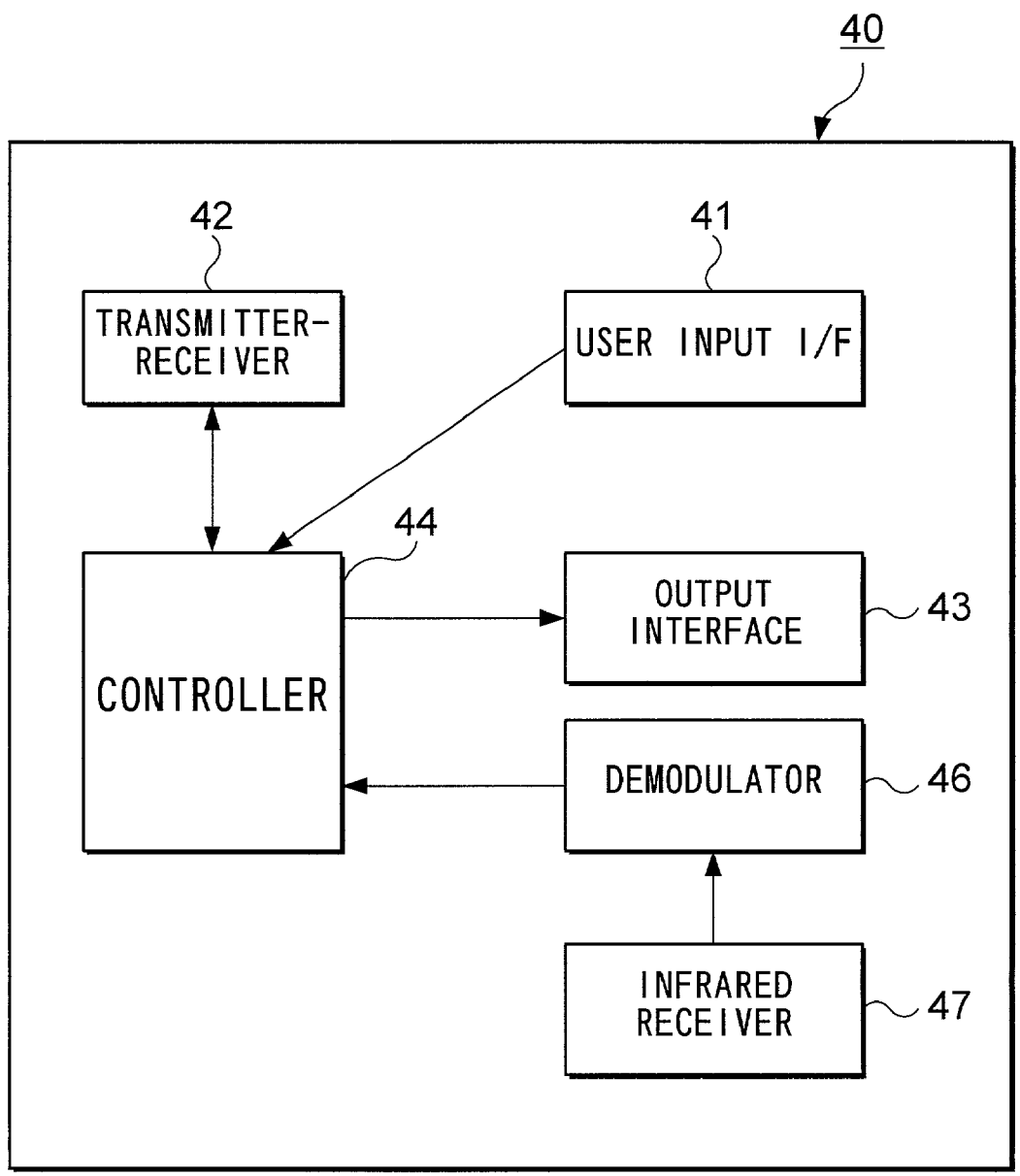
FIG. 24 is a block diagram showing a configuration of a CAT 40 equipped with an infrared receiver and a demodulator.

FIG. 24 is a block diagram showing a configuration of a CAT 40 that is equipped with the infrared receiver and the demodulator.

The CAT 40 comprises a user interface 41, a transmitter-receiver 42, an output interface 43, a controller 44, the infrared receiver 46, and the demodulator 47.

Other configurations and operations here are same as the first embodiment.

[B-7-3. Third Modification]

Further, a mobile station 100 may provide credit card contract information with a CAT 40*a*, 40*b*, . . . through an existing data output terminal.

Figure 25:
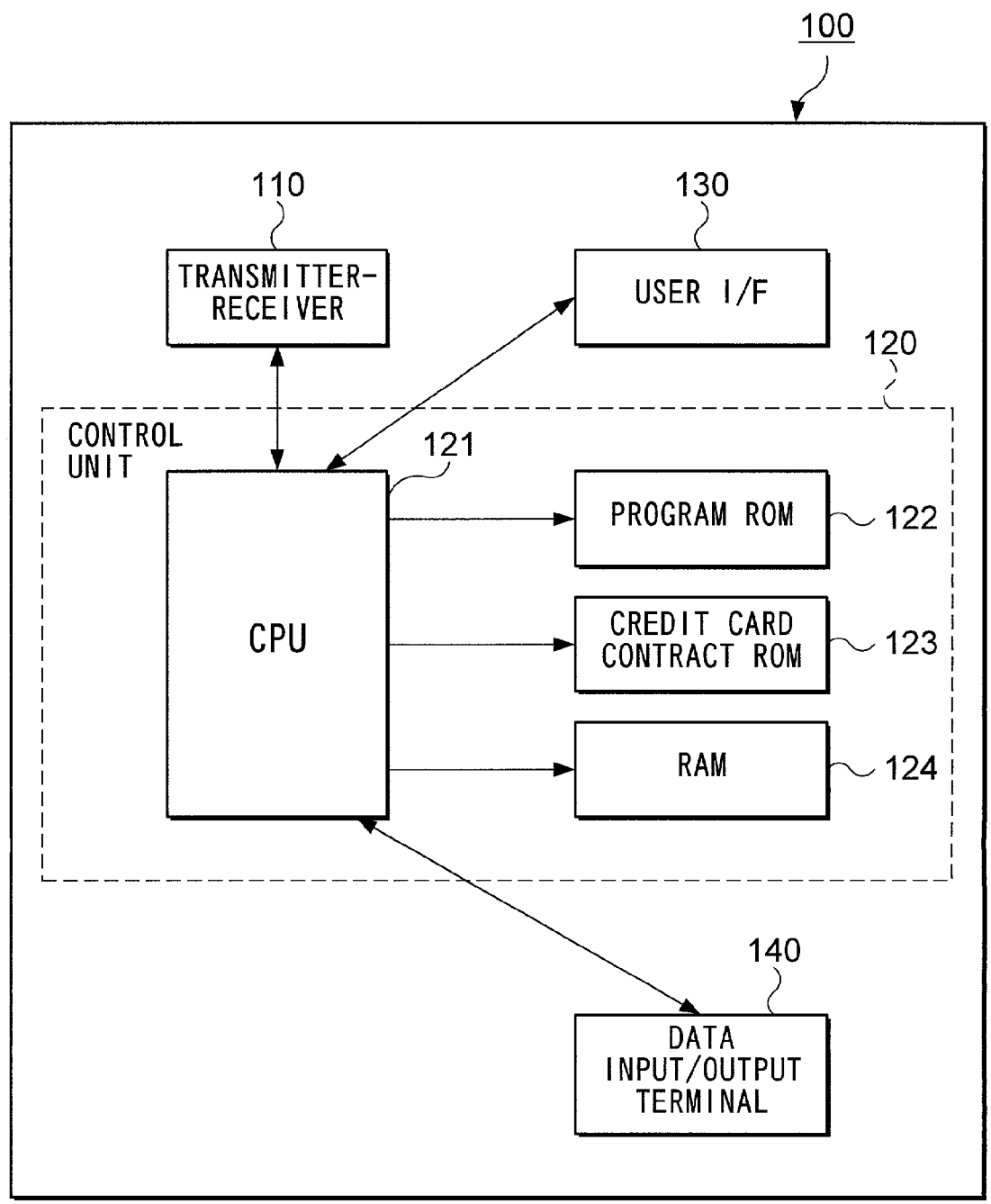
FIG. 25 is a block diagram showing a configuration of a mobile station 100 that transmits credit card contract information to the CAT 40a, 40b, . . . by an existing data input/output terminal.

FIG. 25 is a block diagram showing a configuration of the mobile station 100 where credit card contract information are given to the CAT 40*a*, 40*b*, . . . through the existing data output terminal.

This mobile station 100 comprises a transmitter-receiver 110, a control unit 120, a user interface 130, and a data input/output terminal 140.

When there is a need to give credit card contract information to the CAT 40*a*, 40*b*, . . . , the CPU 121 reads out credit card contract information from the credit card contract ROM 123 and gives them to the data input/output terminal 140. Subsequently, the data input/output terminal 140 provides the given credit card information to a data input/output terminal that is equipped with the CAT 40*a*, 40*b*, . . . .

Figure 26:
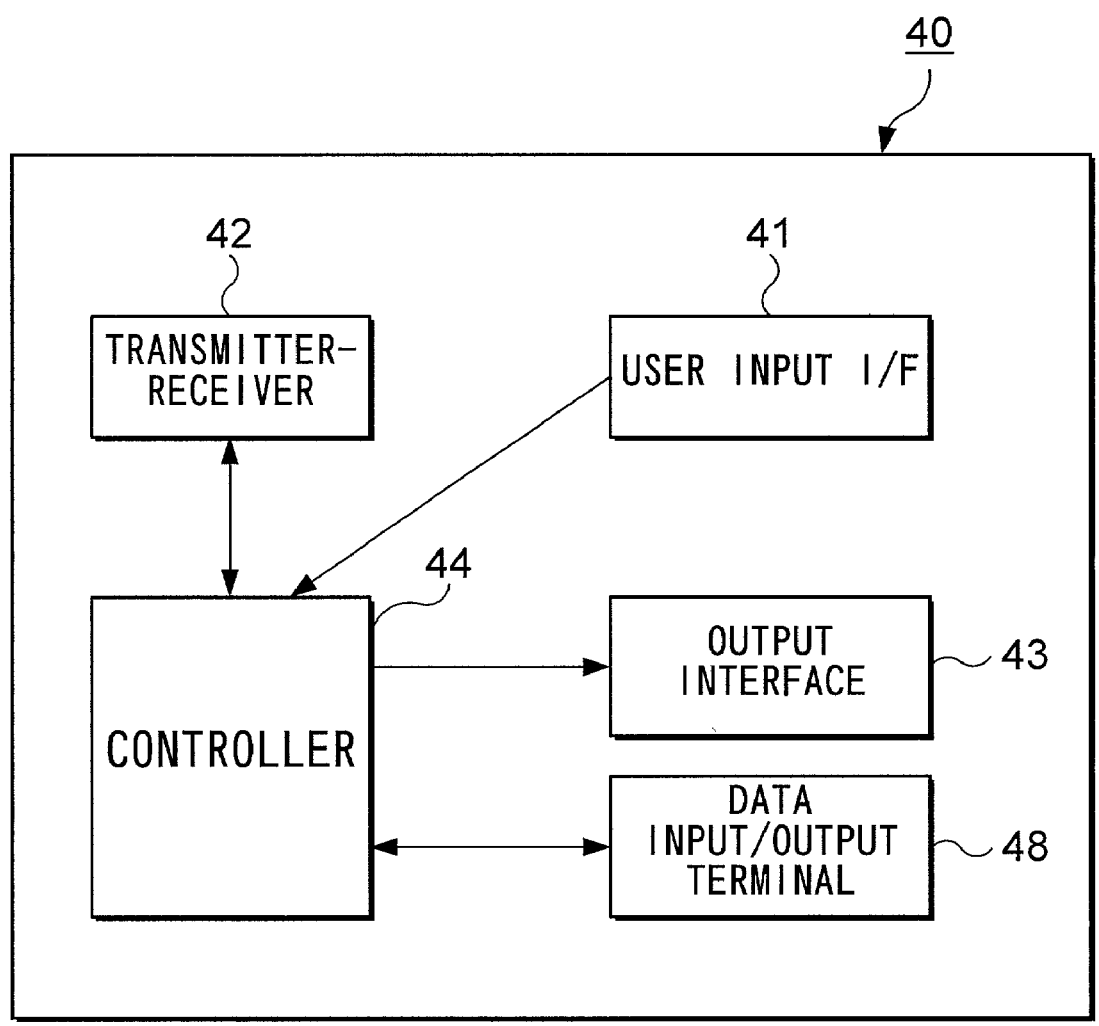
FIG. 26 is a block diagram showing a configuration of a CAT 40 equipped with an input/output terminal.

FIG. 26 is a block diagram showing a configuration of a CAT 40 that is equipped with the data input/output terminal.

The CAT 40 comprises a user interface 41, a transmitter-receiver 42, an output interface 43, a controller 44, and the data input/output terminal 48.

Other configurations and operations here are same as the first embodiment.

[B-7-4. Other Variations in Mobile Station 100 and CAT 40]

In the above-mentioned description concerning the mobile station 100 equipped with a magnetic stripe, the mobile station 100 has only one magnetic stripe 160 to which the magnetic writer 150 writes in credit card contract information every time credit transactions are performed. However, it is not limited thereto.

For example, it is possible to provide a plurality of magnetic stripes 160 on the magnetic card 161 so that one magnetic stripe corresponds to one credit card contract information item. That is, it means to provide as many magnetic stripes 160 as the number of credit card contracts.

In this case, the CAT 40*a*, 40*b*, . . . reads out a magnetic stripe 160 in which card information of the designated credit card company is stored from among a plurality of magnetic stripes 160.

Also, in cases where users carry out credit card shopping only through the mobile packet communication network as mentioned above, the mobile station 100 does not need to have a magnetic stripe 160. This is because it is possible to receive and transmit data to/from the credit card company's server 60A, 60B, . . . only with a wireless communication function in the case of the credit card shopping using the mobile packet communication network.

Further, in the above-mentioned description, mobile stations such as cellular phones and PHS possess the card information of credit cards. However, the carrier side is not limited to a mobile station 100 but may be any mobile communication terminal without a calling function, for example, PDA.

Further, in the above-mentioned description, the CAT 40A, 40B, . . . may give its own information to the mobile station 100. For example, in the case of credit card shopping, information such as the date of sales, merchant, sales amount that are stored in the CAT 40A, 40B, . . . may be given to a mobile station 100. By doing this, the mobile station 100 can, without making an access the credit card company's server 60A, 60B, . . . , accumulate its credit history based on which one is able to total the amount of credit purchases to be drawn from one's bank account.

To do this, in each of the above-mentioned embodiments, the CAT 40*a*, 40*b*, . . . may be equipped with a data input/output terminal capable of giving the above information by being connected to the data input/output terminal of the mobile station 100.

[B-8. Variations in User Authentication]

The above-mentioned embodiments are such that the gateway server 32 conducts user authentication by matching the password pre-stored in the gateway server 32 and the password entered to the mobile station 100 by its user upon a request for starting a packet communication, but it is not limited thereto.

For example, the mobile station 100 may store a password for user authentication in advance. By doing this, the mobile station 100 can conduct user authentication without carrying out communication with the gateway server 32.

Further, in addition to the password (a first password) stored in the gateway server 32, another password (a second password) may be stored in the credit card company's server 60. In this case, upon starting a packet communication, the first password is matched between the mobile station 100 and the gateway server 32, the second password further being matched between the mobile station 100 and the credit card company's server 60 at the time of shopping with credit card or inquiring for one's credit history. Thus, it is expected to enhance the protection of privacy and security in using credit.

The invention claimed is:

1. A communication network which communicates with a mobile terminal that has communication functionality and financial functionality of effecting financial services provided by at least one financial institution, the communication network comprising:
    a communication control that communicates data with the mobile terminal and the at least one financial institution to have the financial services implemented;
    a memory in which an identification of the mobile terminal is recordable along with information concerning the mobile terminal as to whether to disable the financial functionality accorded to the mobile terminal;
    a memory control that, in response to a report notifying a possibility of fraud which may be committed with the financial functionality of the mobile terminal, stores in the memory, in connection with the mobile terminal, information indicating that the financial functionality has to be disabled;
    a terminal control that, if the memory indicates that the financial functionality has to be disabled, sends a disabling signal, independently of the at least one financial institution, to the mobile terminal to which the financial functionality is accorded, wherein the disabling signal causes the mobile terminal to at least partially disable either or both of the communication functionality and the financial functionality of effecting financial services.

2. A communication network according to claim 1, wherein the communication network is a wireless communication network and the mobile terminal is a wireless mobile telephone.

3. A communication network according to claim 1, wherein the financial services comprise a service for advancing a credit.

4. A communication network according to claim 1, wherein the terminal is configured to selectively effect the financial services provided by multiple financial institutions.

5. A communication network according to claim 1, wherein the terminal control sends the disabling signal when the terminal becomes receptive to the disabling signal.

6. A communication network according to claim 5, wherein the terminal control sends the disabling signal when the terminal initiates a connection to the communication network.

7. A communication network according to claim 5, wherein the terminal control sends the disabling signal when the terminal is turned on.

8. A communication network according to claim 1, wherein the terminal control checks the memory to see whether to disable the mobile terminal, when the mobile terminal sends a dispatch signal to a nearby base station.

9. A communication network according to claim 1, wherein the disabling signal causes the mobile terminal to erase data in the mobile terminal regarding the financial services.

* * * * *

UNITED STATES PATENT AND TRADEMARK OFFICE
CERTIFICATE OF CORRECTION

PATENT NO. : 7,231,202 B2
APPLICATION NO. : 09/890830
DATED : June 12, 2007
INVENTOR(S) : Takeshi Natsuno It is certified that error appears in the above-identified patent and that said Letters Patent is hereby corrected as shown below:

<u>In the Title</u>

In the title, delete "INHIBITING USE OF MOBILE COMMUNICATION TERMINAL HAVING MEMORY WHERE CARD INFORMATION IS STORED, MOBILE COMMUNICATION NETWORK, AND MOBILE COMMUNICATION TERMINAL" and substitute --DISABLING MOBILE COMMUNICATION TERMINAL EQUIPPED WITH MEMORY FOR STORING CARD INFORMATION, MOBILE COMMUNICATION NETWORK AND MOBILE COMMUNICATION TERMINAL-- in its place.

Signed and Sealed this

Sixth Day of November, 2007

JON W. DUDAS
*Director of the United States Patent and Trademark Office*